US012149344B2

(12) United States Patent
Kumari et al.

(10) Patent No.: US 12,149,344 B2
(45) Date of Patent: Nov. 19, 2024

(54) BISTATIC CHANNEL ESTIMATION USING RANGING FEEDBACK

(71) Applicant: QUALCOMM Incorporated, San Diego, CA (US)

(72) Inventors: Preeti Kumari, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 17/412,235

(22) Filed: Aug. 25, 2021

(65) Prior Publication Data

US 2023/0067671 A1 Mar. 2, 2023

(51) Int. Cl.
*H04L 1/00* (2006.01)
*G01S 7/00* (2006.01)
*G01S 7/41* (2006.01)
*H04B 7/06* (2006.01)

(52) U.S. Cl.
CPC ............ *H04L 1/0001* (2013.01); *G01S 7/006* (2013.01); *G01S 7/411* (2013.01); *H04B 7/06* (2013.01)

(58) Field of Classification Search
CPC ........ H04L 1/0001; G01S 7/006; G01S 7/411; G01S 17/42; G01S 13/003; G01S 13/42; G01S 13/878; G01S 17/003; G01S 2013/9316; H04B 7/06954; H04B 7/0456
See application file for complete search history.

(56) References Cited

U.S. PATENT DOCUMENTS

2023/0221425 A1* 7/2023 Edstaller ............... G01S 13/003
342/87

FOREIGN PATENT DOCUMENTS

WO WO-2022200673 A1 * 9/2022

\* cited by examiner

*Primary Examiner* — Bernarr E Gregory
*Assistant Examiner* — Juliana Cross
(74) *Attorney, Agent, or Firm* — Loza & Loza, LLP

(57) ABSTRACT

Aspects relate to techniques for communication between wireless communication devices using ranging channel information obtained by each of the wireless communication devices. For example, a first wireless communication device may obtain first monostatic ranging channel information based on reflected ranging signals received in response to transmission of a ranging signal. In addition, the first wireless communication device may receive ranging feedback information from a second wireless communication device associated with second monostatic ranging channel information obtained by the second wireless communication device. The first wireless communication device may then determine bistatic channel information from the first monostatic ranging channel information and the ranging feedback information and transmit a message to the second wireless communication device based on the bistatic channel information.

30 Claims, 12 Drawing Sheets

BISTATIC CHANNEL ESTIMATION USING RANGING FEEDBACK

TECHNICAL FIELD

The technology discussed below relates generally to wireless communication networks, and more particularly, to techniques for bistatic communication channel estimation based on monostatic ranging sensing and monostatic ranging feedback.

BACKGROUND

Some wireless communication devices, such as user equipment (UE) and/or base stations, may be equipped with a radar or lidar system. For example, a radar system may include a radar transceiver configured to transmit a radar signal periodically at a high rate to sense the environment. The radar signal may be reflected by surrounding objects, referred to as scatterers or scattering clusters, and the resulting radar echoes may be received by the radar transceiver. The received radar echoes may then be processed to estimate the channel parameters of respective two-way monostatic channels between the wireless communication device and each of the other surrounding objects. Here, the term monostatic refers to a channel in which a transmitter and receiver are at the same location. The monostatic channel parameters that may be estimated using the radar echoes may include, for example, the Doppler shift profile, delay profile, and angular profile.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device configured for wireless communication is disclosed. The first wireless communication device includes a transceiver, a ranging device, a memory, and a processor coupled to the transceiver, the ranging device, and the memory. The processor and the memory are configured to transmit a ranging signal via the ranging device, receive reflected ranging signals based on the ranging signal via the ranging device to obtain first monostatic ranging channel information, receive, from a second wireless communication device via the transceiver, ranging feedback information based on second monostatic ranging channel information obtained by the second wireless communication device, and transmit a message to the second wireless communication device via the transceiver based on bistatic channel information. The bistatic channel information is based on the first monostatic ranging channel information and the ranging feedback information.

Another example provides a method for wireless communication at a first wireless communication device. The method includes transmitting a ranging signal, receiving reflected ranging signals based on the ranging signal to obtain first monostatic ranging channel information, receiving, from a second wireless communication device, ranging feedback information based on second monostatic ranging channel information obtained by the second wireless communication device, and transmitting a message to the second wireless communication device based on bistatic channel information. The bistatic channel information is based on the first monostatic ranging channel information and the ranging feedback information.

Another example provides a first wireless communication device configured for wireless communication. The first wireless communication device includes means for transmitting a ranging signal, means for receiving reflected ranging signals based on the ranging signal to obtain first monostatic ranging channel information, means for receiving, from a second wireless communication device, ranging feedback information based on second monostatic ranging channel information obtained by the second wireless communication device, and means for transmitting a message to the second wireless communication device based on bistatic channel information. The bistatic channel information is based on the first monostatic ranging channel information and the ranging feedback information.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
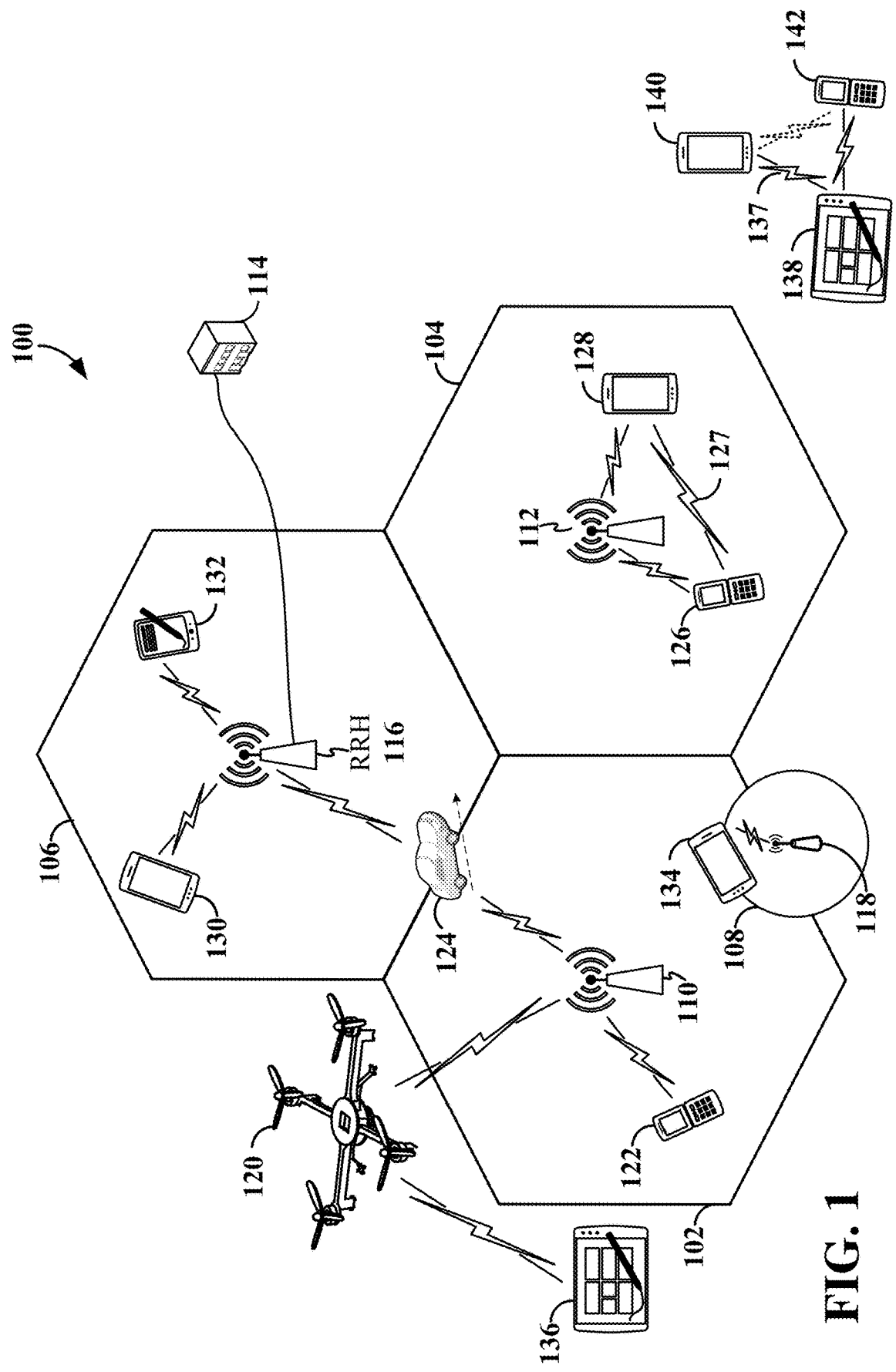
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to techniques for bistatic channel estimation using ranging channel information obtained by each of the wireless communication devices. For example, a first wireless communication device may transmit a ranging signal (e.g., a radar or lidar signal) and receive reflected ranging signals based on the ranging signal to obtain first monostatic ranging channel information. In addition, the first wireless communication device may receive ranging feedback information from a second wireless communication device corresponding to second monostatic ranging channel information obtained by the second wireless communication device. The first wireless communication device may then determine bistatic channel information from the first monostatic ranging channel information and the ranging feedback information and transmit a message to the second wireless communication device based on the bistatic channel information.

For example, the first wireless communication device may adjust one or more communication parameters for transmission of the message to the second wireless communication device based on the bistatic channel information. Examples of communication parameters may include, but are not limited to, a density of a demodulation reference signal (DMRS), a beamforming parameter (e.g., a beam width or beam direction), a precoding matrix, a subcarrier spacing, a cyclic prefix (CP) length, a transmission bandwidth, a rate-matching parameter, a transmit power, a transmit waveform, or a transmit diversity scheme. The bistatic channel information used to select the one or more communication parameters may include, for example, an average delay, average Doppler shift, average angular information (e.g., elevation and azimuth), delay spread, Doppler spread, or angular spread. By using ranging information, including ranging feedback information from the second wireless communication device, to select communication parameters for transmission of a message, the overhead in the communication network may be reduced and the communication data rate over the wireless link between the first and second wireless communication devices may be increased.

In some examples, the first monostatic ranging channel information may include cluster information associated with one or more first scatterers (e.g., surrounding objects) detected by the first wireless communication device based on the reflected ranging signals. For example, the first monostatic ranging channel information may include one or more of a respective delay, azimuth, or elevation within a delay spread associated with each of the one or more first scatterers. In addition, the feedback information may include second cluster information associated with one or more second scatterers detected by the second wireless communication device. The first wireless communication device may associate the first cluster information with the second cluster information to identify one or more bistatic channel scatterers common to both the first and second cluster information. In some examples, the first and second cluster information may be associated based on the location (e.g., absolute or relative) and orientation of the second wireless communication device with respect to the first wireless communication device. In addition, the bistatic channel scatterers may be identified by associating the first scatterers with the second scatterers based on the respective locations and orientations of each of the first and second scatterers.

In some examples, the first wireless communication device may adjust the DMRS density based on the delay and Doppler spread of each of the bistatic channel scatterers. In some examples, the first wireless communication device may select a beam or precoding matrix for transmission of the message based on the average angular information and angular spread of each of the bistatic channel scatterers. In some examples, the first wireless communication device may track the bistatic channel scatterers using additional monostatic ranging information and additional ranging feedback information to identify a cluster motion of each of the bistatic channel scatterers. The first wireless communication device may then adjust one or more of a beam, precoding matrix, or DMRS density based on the cluster motions.

In some examples, the bistatic channel information may further include link information indicating whether there is a line-of-sight (LOS) or non-LOS (NLOS) link between the first wireless communication device and the second wireless communication device. For example, the first wireless communication device may identify a LOS link when a respective location of at least one first bistatic channel scatter matches the respective location of a corresponding second bistatic channel scatterer. For LOS links, the first wireless communication device may adjust a time synchronization of the LOS link based on the average delay or delay spread of the bistatic channel scatterers. The first wireless communication device may further adjust one or more of a beam width, a transmit power, or a transmit diversity scheme based on the locations and angular spread of the bistatic channel scatterers.

The first wireless communication device may identify a NLOS link when the respective locations of the first scatterers do not match any of the locations of the second scatterers. For NLOS links, the first wireless communication device may determine an association matrix indicating a respective association between each of the first and second scatterers and adjust at least one of a transmit waveform or a beamforming parameter (e.g., beam direction or beam width). For example, the $(i,j)^{th}$ element of the association matrix may be a one if there is an association between the $i^{th}$ first scatterer and the $j^{th}$ second scatterer and a zero if there is no association. In some examples, the association matrix may be determined to achieve low variance of the estimated location and orientation of the second wireless communication device (e.g., with respect to the first wireless communication device) among the different scatterers for multiple snapshots (e.g., multiple ranging signal transmissions/reflected ranging signal receptions) and to further produce a minimum estimated error covariance of the tracked location and orientation of the second wireless communication device over the multiple snapshots. The tracked location and orientation of the second wireless communication device may further be utilized to synchronize the first and second wireless communication devices.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
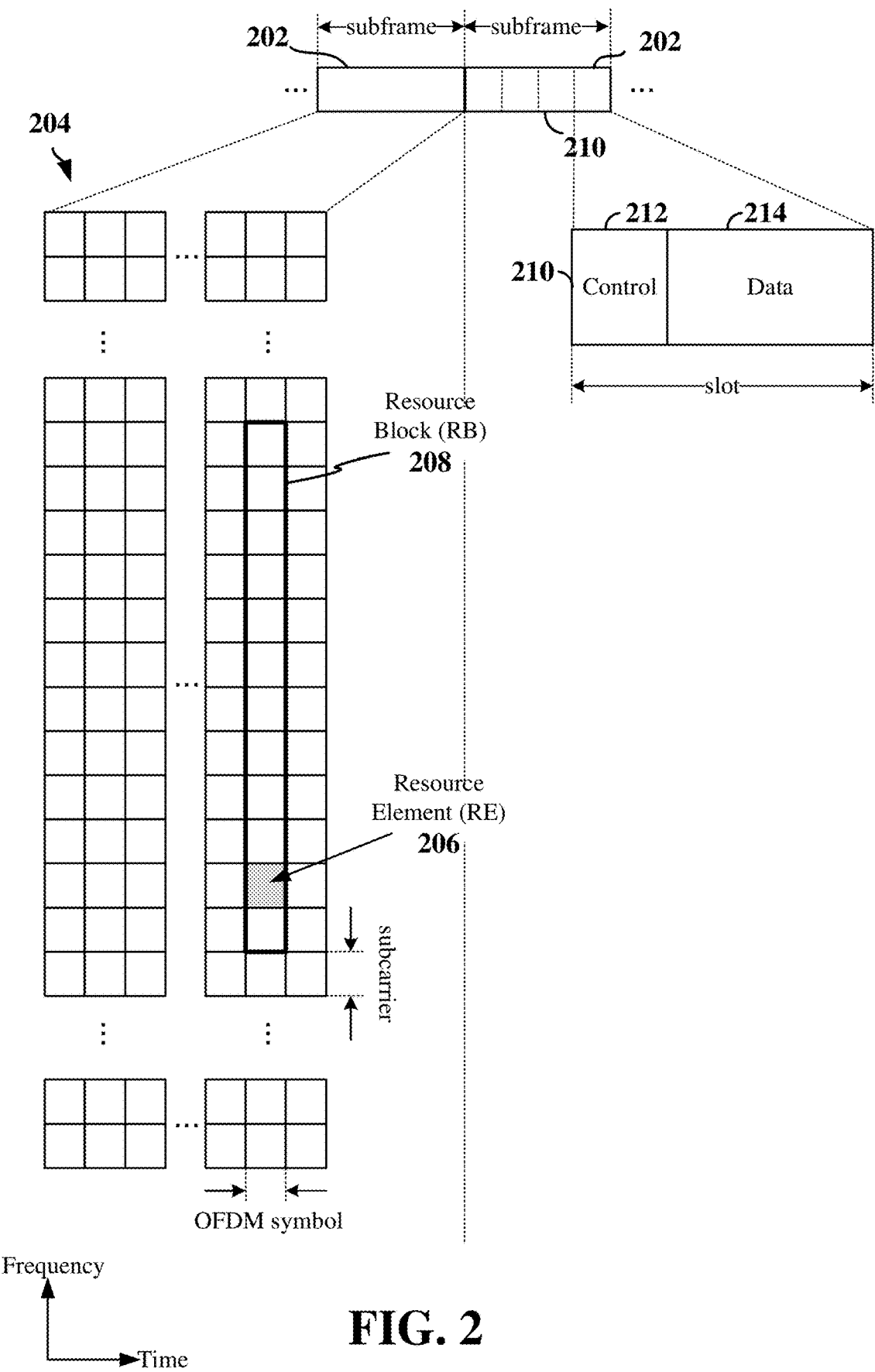
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12

OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DRMS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
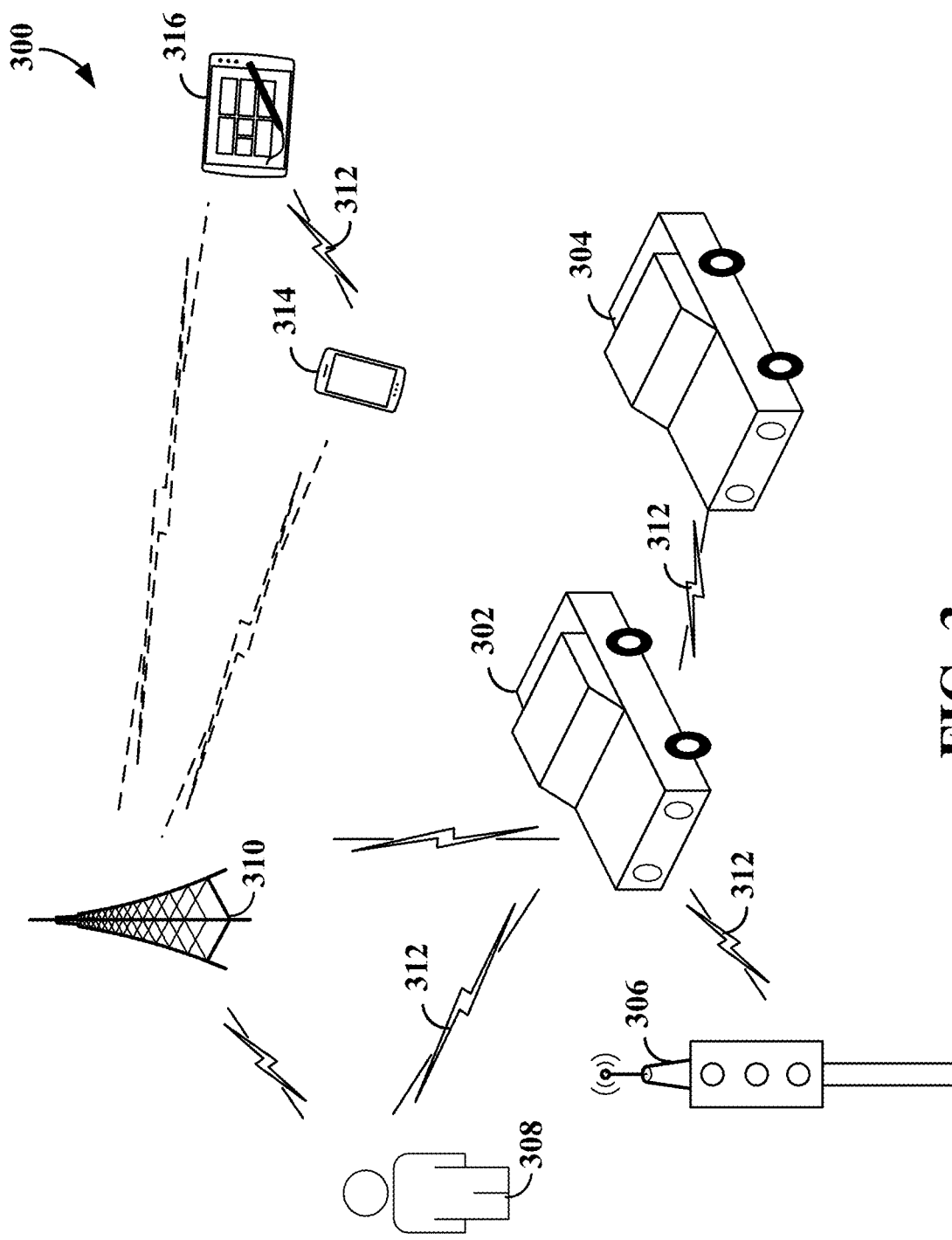
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308 (e.g., vulnerable road users (VRUs)), and vehicles 302/304 and wireless communication networks (e.g., base station 310). VRUs may include not only pedestrians, but also bicycle riders, road construction crews, etc. V2X devices at VRUs may include, for example, cell phones, vehicle/bike mounted hardware, smart watches, construction equipment, etc. In some examples, V2X communication may be implemented in accordance with the New Radio (NR) cellular V2X standard defined by 2GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink (or sidelink channel) 312 utilizing a proximity service (ProSe) PC5 interface. In various aspects of the disclosure, the PC5 interface may further be utilized to support D2D sidelink communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D or V2X sidelink communication between, for example, V-UEs 302 and 304 over the sidelink 312, the V-UEs 302 and 304 may transmit discovery signals therebetween. In some examples, each discovery signal may include a synchronization signal, such as a primary synchronization signal (PSS) and/or a secondary synchronization signal (SSS) of a sidelink SSB that facilitates device discovery and enables synchronization of communication on the sidelink 312. For example, the discovery signal may be utilized by the V-UE 304 to measure the signal strength (e.g., signal-to-noise ratio (SNR)) and channel status of a potential sidelink (e.g., sidelink 312) with another UE (e.g., V-UE 302). The V-UE 304 may utilize the measurement results to select a UE (e.g., V-UE 302) for sidelink communication or relay communication.

In addition, the V-UE 304 may send V2X feedback messages to the V-UE 302. For example, the V2X feedback messages sent by V-UE 304 to V-UE 302 may include one or more of an identifier of V-UE 302 and/or the obtained measurement (e.g., SNR) of the two-way bistatic sidelink channel between V-UE 302 and V-UE 304. Here, the term bistatic refers to a channel in which a transmitter and receiver are at different locations. The V2X feedback messages may be used to enhance the data rate and communication efficiency of the sidelink channel between V-UE 302 and V-UE 304. However, the V2X feedback messages may be sent with a limited update rate.

Figure 4:
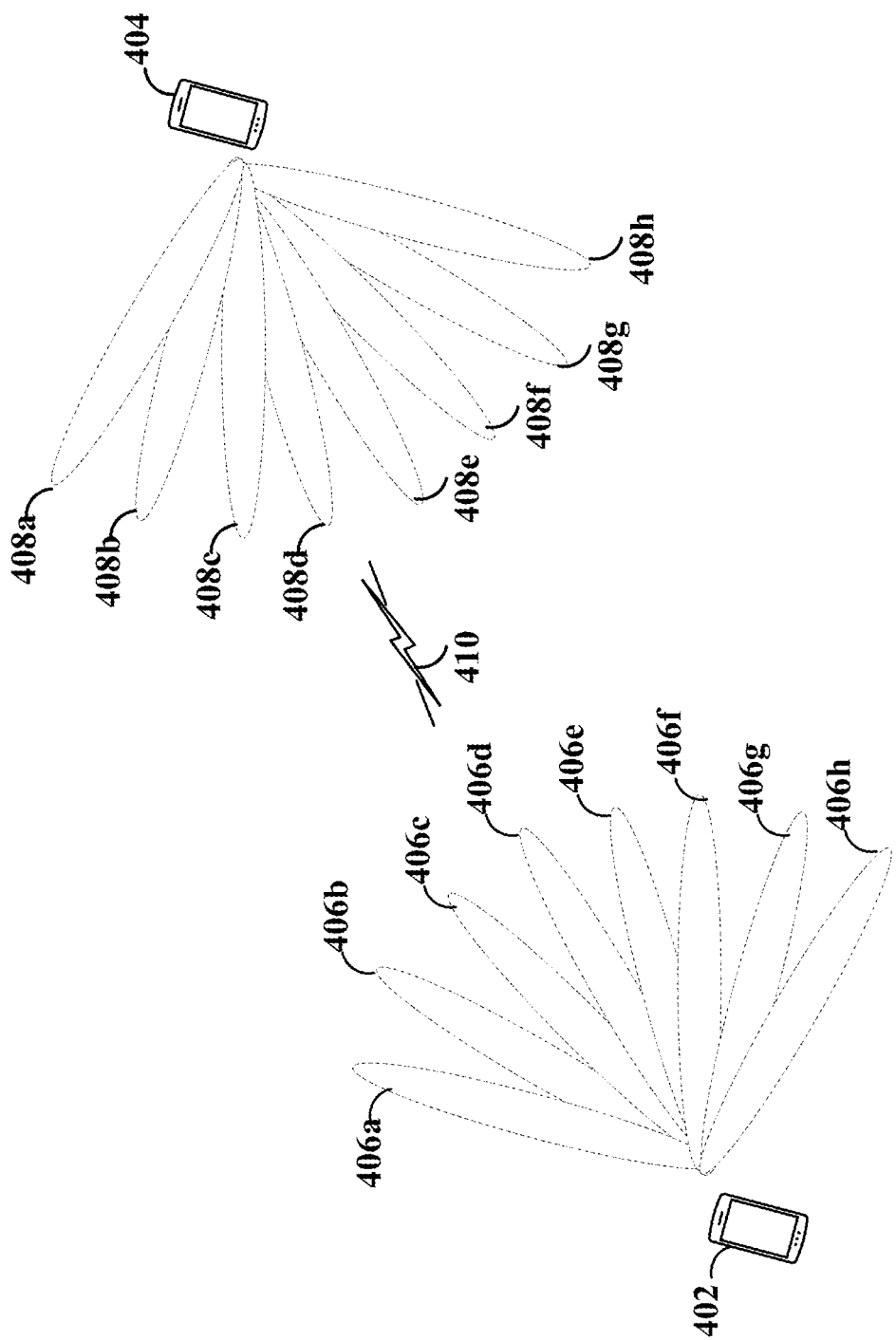
FIG. 4 is a diagram illustrating beamforming in a sidelink network according to some aspects.

FIG. 4 is a diagram illustrating communication between wireless communication devices 402 and 404 using beam-formed sidelink signals according to some aspects. Each of the wireless communication devices 402 and 404 may be any of the UEs or V2X devices illustrated in any of FIGS. 1 and/or 2.

In the example shown in FIG. 4, the wireless communication devices 402 and 404 may be configured to communicate sidelink signals 410 on one or more of a plurality of beams 406a-406h. Although the beams 406a-406h are illustrated in FIG. 4 as being generated on wireless communication device 402, it should be understood that the same concepts described herein apply to beams generated on wireless communication device 404. For example, each wireless communication device 402 and 404 may select one or more beams to transmit sidelink signals to the other wireless communication device. In some examples, due to channel reciprocity, the selected beam(s) on each wireless communication device 402 and 404 may be used for both transmission and reception of sidelink signals. It should be noted that while some beams are illustrated as adjacent to one another, such an arrangement may be different in different aspects. In some examples, the wireless communication devices 402 and 404 may generate more or less beams distributed in different directions.

The number of beams on which a particular wireless communication device 402 or 404 may simultaneously communicate may be defined based on NR SL standards and specifications and capabilities of the wireless communication devices 402 and 404. For example, the number of beams may be determined based on a number of antenna panels configured on the wireless communication device 402 or 404. As an example, a wireless communication device 402 or 404 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 402 and 404, a first wireless communication device (e.g., wireless communication device 402) may transmit a sidelink reference signal, such as a sidelink synchronization signal block (SSB) or sidelink channel state information (CSI) reference signal (RS), on each of the plurality of beams 406a-406h in a beam-sweeping manner towards a second wireless communication device (e.g., wireless communication device 404). The second wireless communication device 404 searches for and identifies the beams based on the beam reference signals. The wireless communication device 402 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 404 may then transmit a beam measurement report to the first wireless communication device indicating the beam quality of one or more of the measured beams. The first wireless communication device or a radio access network (RAN) node (e.g., a base station, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam (e.g., beam 406d) on one of the wireless communication devices (e.g., wireless communication device 402) may form a beam pair link (BPL) with a corresponding selected beam (e.g., beam 408d) on the other wireless communication device 404. Thus, each BPL includes corresponding transmit and receive beams on the wireless communication devices 402 and 404. For example, a BPL may include a first transmit/receive beam 406d on the first wireless communication device 402 and a second transmit/receive beam 408d on the second wireless communication device 404. To increase the data rate, multiple BPLs can be used to facilitate spatial multiplexing of multiple data streams. In some examples, the different BPLs can include beams from different antenna panels.

Figure 5:
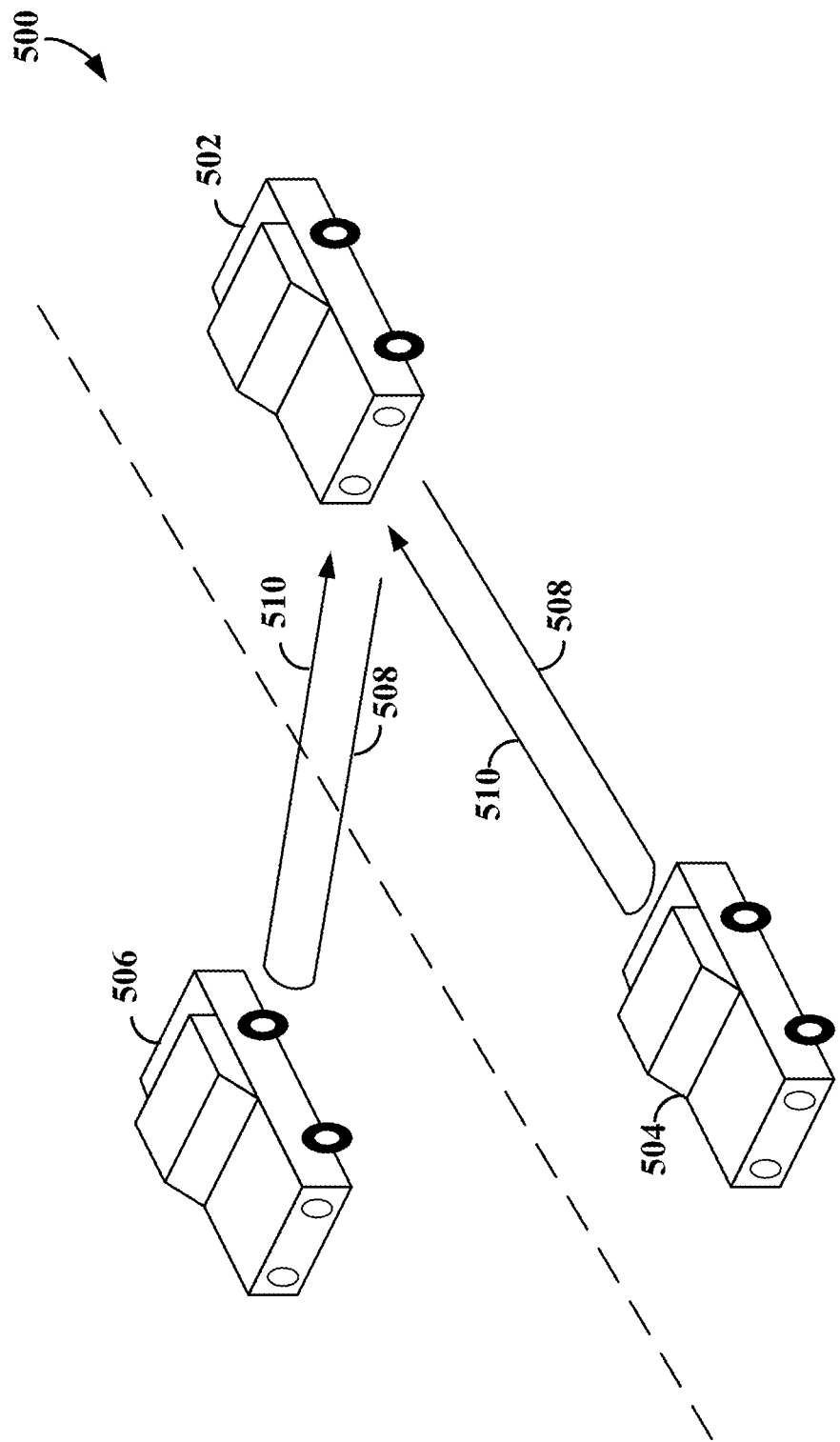
FIG. 5 is a diagram illustrating an example of V2X devices employing automotive radar according to some aspects.

In various aspects of the disclosure, wireless communication devices, such as UEs and/or base stations, may further be equipped with a radio detection and ranging (radar) system. Although the description herein refers to radar systems, the present disclosure may be applicable to other sensing systems, such as light detection and ranging (lidar) systems. FIG. 5 illustrates an example of V2X devices 502, 504, and 506 employing automotive radar/lidar systems. However, it should be understood that radar/lidar systems may be employed on other wireless communication devices, such as base stations (e.g., eNBs, gNBs, TRPs, etc.) and UEs in cellular network configurations, and the present disclosure is not limited to any particular type of wireless communication device or network configuration.

In the example shown in FIG. 5, V-UE 502 is shown in proximity to V-UEs 504 and 506. V-UE 502 includes an automotive radar system including a radar transceiver (or a laser and corresponding optics for transmission and reception of lidar signals (e.g., light)). The automotive radar transceiver may be configured to transmit a radar signal 508 periodically at a high rate to sense the environment. The radar signal 508 may be reflected by surrounding objects (e.g., V-UEs 504 and 506), and the resulting radar echoes (e.g., reflected radar signals/lidar signals) 510 may be received by the radar transceiver in full-duplex configuration. The surrounding objects may be referred to herein as scatterers or scattering clusters.

The received radar echoes 510 may then be processed to estimate the channel parameters of respective two-way monostatic channels between V-UE 502 and each of the other surrounding objects (e.g., V-UEs 504 and 506). Here, the term monostatic refers to a channel in which a transmitter and receiver are at the same location (e.g., at V-UE 502). The channel parameters that may be estimated using the radar echoes may include, for example, the delay spread, Doppler shift profile and angular profile. Thus, the V-UE 502 may estimate the respective Doppler spread (e.g., Doppler shift profile) and angular spread (e.g., angular profile) of the respective two-way monostatic channel between V-UE 502 and V-UE 504 and between V-UE 502 and V-UE 506. The angular profile may include, for example, the azimuth and elevation corresponding to a received radar echo. In examples in which the automotive radar system utilizes large antenna arrays and long coherent processing time intervals, the accuracy of the angular and velocity estimations may be high. However, radar systems may suffer from poor data association and may have limited sensing capabilities due to small coverage, blockage, and clutter in the environment.

In some examples, V-UE 502 may further include a communication transceiver for sidelink communication over a two-way bistatic sidelink channel between V-UE 502 and V-UE 504. Thus, V-UE 502 may be configured to transmit sidelink (e.g., V2X) transmissions to V-UE 504. For high-data rate (e.g., a few Gbs) vehicular applications, V-UE 502 may further be configured to transmit the sidelink transmissions to V-UE 504 on a selected transmit beam (e.g., of an FR2 band, such as 73 GHz) with a high bandwidth (e.g., 2 GHz). However, due to vehicular mobility and blockage from surrounding objects, V-UE 502 may suffer a reduction in its communication capability (e.g., intermittent outage). For example, V-UE 506 may initiate a lane change maneuver, disrupting a line-of-sight link between V-UE 502 and V-UE 504. As another example, V-UE 502 may engage in a large acceleration that may impact the communication link with V-UE 504.

To enable robust and efficient communication resulting in high spectral efficiency with a low transmit power, V-UE 502 may perform additional beamforming training and communication channel sensing to select a new transmit/receive beam for communication with V-UE 504. However, this may add additional overhead and decrease the communication data rate.

Therefore, various aspects of the disclosure relate to techniques for bistatic channel estimation using ranging channel information obtained by each of the wireless communication devices. For example, a first wireless communication device may obtain first monostatic ranging channel information based on reflected ranging signals (e.g., radar echoes or reflected light) received in response to transmission of a ranging signal. In addition, the first wireless communication device may receive ranging feedback information from a second wireless communication device corresponding to second monostatic ranging channel information obtained by the second wireless communication device. The first wireless communication device may then determine bistatic channel information from the first monostatic ranging channel information and the feedback information and transmit a message to the second wireless communication device based on the bistatic channel information. Examples of bistatic channel information may include, but are not limited to, an average delay, average Doppler shift, average angular information (e.g., elevation and azimuth), delay spread, Doppler spread, or angular spread.

For example, the first wireless communication device may adjust one or more communication parameters based on the bistatic channel information for transmission of the message. Examples of communication parameters may include, but are not limited to, a density of a DMRS, a beam, a beamforming parameter (e.g., a beam width), a precoding matrix, a subcarrier spacing, a cyclic prefix length, a transmission bandwidth, a rate-matching parameter, a transmit power, a transmit waveform, or a transmit diversity scheme.

Figure 6A:
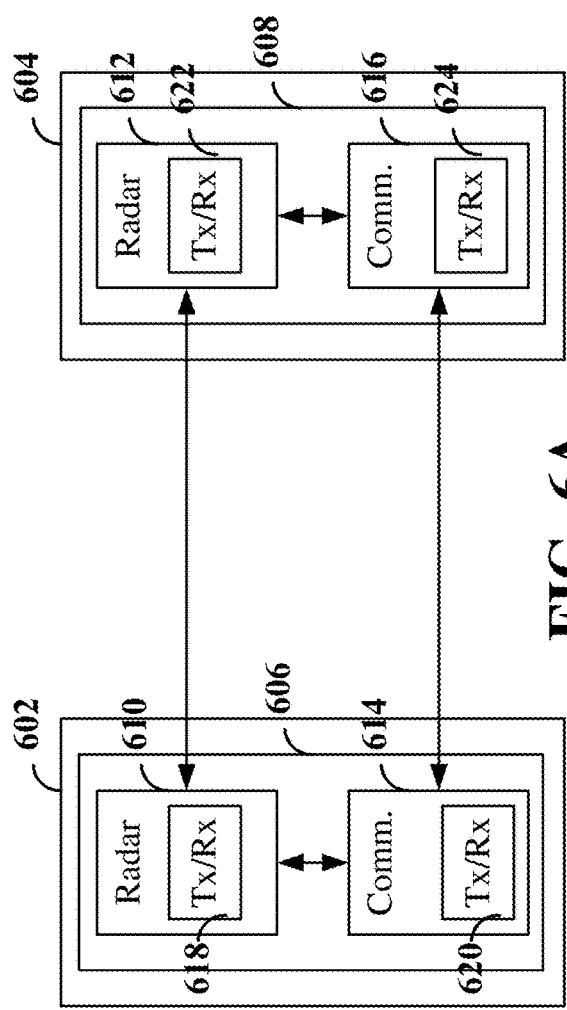
FIGS. 6A and 6B illustrate examples of joint communication-radar (JCR) systems that may be implemented on wireless communication devices according to some aspects.
Figure 6B:
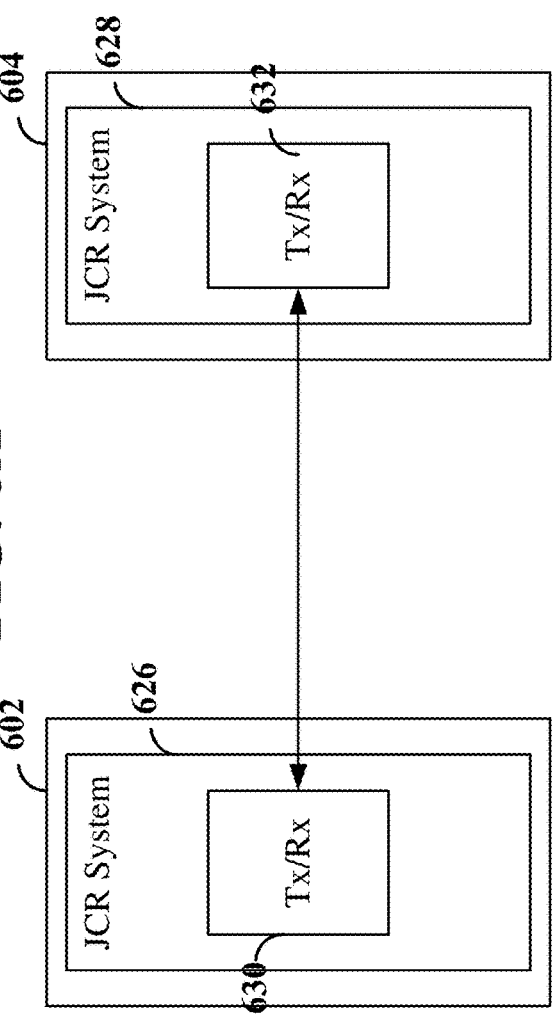

To facilitate bistatic channel estimation based on ranging channel information, a wireless communication device may include a joint communication radar (JCR) system that enables sharing of information between communication and radar. Aspects may further provide a similar joint communication and lidar (JCL) system that enables sharing of information between communication and lidar. FIGS. 6A and 6B illustrate examples of JCR systems that may be implemented on wireless communication devices 602 and 604 according to some aspects. In some examples, each of the wireless communication devices 602 and 604 may be a UE. For example, the UEs 602 and 604 may correspond to any of the sidelink (e.g., V2X) devices, D2D devices, or other UEs shown in any of FIGS. 1, 3, and 4. In other examples, one of the wireless communication devices (e.g., wireless communication device 602) may be a base station and the other wireless communication device 604 may be a UE. For example, the base station 602 may correspond to any of the base stations (e.g., eNB, gNB, TRP, etc.) shown in any of FIGS. 1 and 3. In addition, the UE 604 may correspond to any of the UEs or other scheduled devices shown in any of FIGS. 1, 3, and 4.

In the example shown in FIG. 6A, each of the wireless communication devices 602 and 604 includes a respective JCR system 606 and 608. Each JCR system 606 and 608 includes a respective radar system 610 and 612 and a respective communication system 614 and 616. Each of the radar systems 610 and 612 may be configured to transmit respective radar signals and receive respective radar echoes of the radar signals reflected from nearby objects (e.g., scatterers). In addition, each of the communication systems 614 and 616 may be configured to transmit messages (e.g., signals, control information, and/or data) to the other wireless communication device. For example, the communication system 614 in the wireless communication device 602 may transmit a message, which may be received by the communication system 616 in wireless communication device 604.

The radar systems 610 and 612 are separate from the respective communication systems 614 and 616, and therefore, each wireless communication device 602 and 604 may include separate transceivers for radar and communication. For example, the radar system 610 may include a radar transceiver 618 and the communication system 614 may include a communication transceiver 620. In addition, the radar system 612 may include a radar transceiver 622 and the communication system 616 may include a communication transceiver 624. The respective radar systems 610 and 612 are illustrated in FIG. 6A as being co-located and cooperative with the respective communication systems 614 and 616, such that radar information obtained by a radar system (e.g., radar system 610) on a wireless communication device (e.g., wireless communication device 602) may be provided to the co-located communication system 614 on the wireless communication device to improve the performance of the communication system. Similarly, communication information obtained by the communication system 614 may be provided to the radar system 610 to improve the performance of the radar system 610. For a JCL system, each wireless communication device 602 and 604 may include a lidar system that includes a laser and corresponding optics for transmission of light and reception of reflected light.

In the example shown in FIG. 6B, each of the wireless communication devices 602 and 604 includes a respective JCR system 626 and 628 that utilizes a respective common transceiver 630 and 632 for both communication and radar. Thus, the JCR systems 626 and 628 are co-designed communication and radar systems. The co-design may be radar-centric, communication-centric, or a shared joint-design. In some examples, the JCR systems 626 and 628 may include modifications in the transmit waveform generation, the receiver processing, or both to accommodate both radar and communication transmission/reception.

Figure 7:
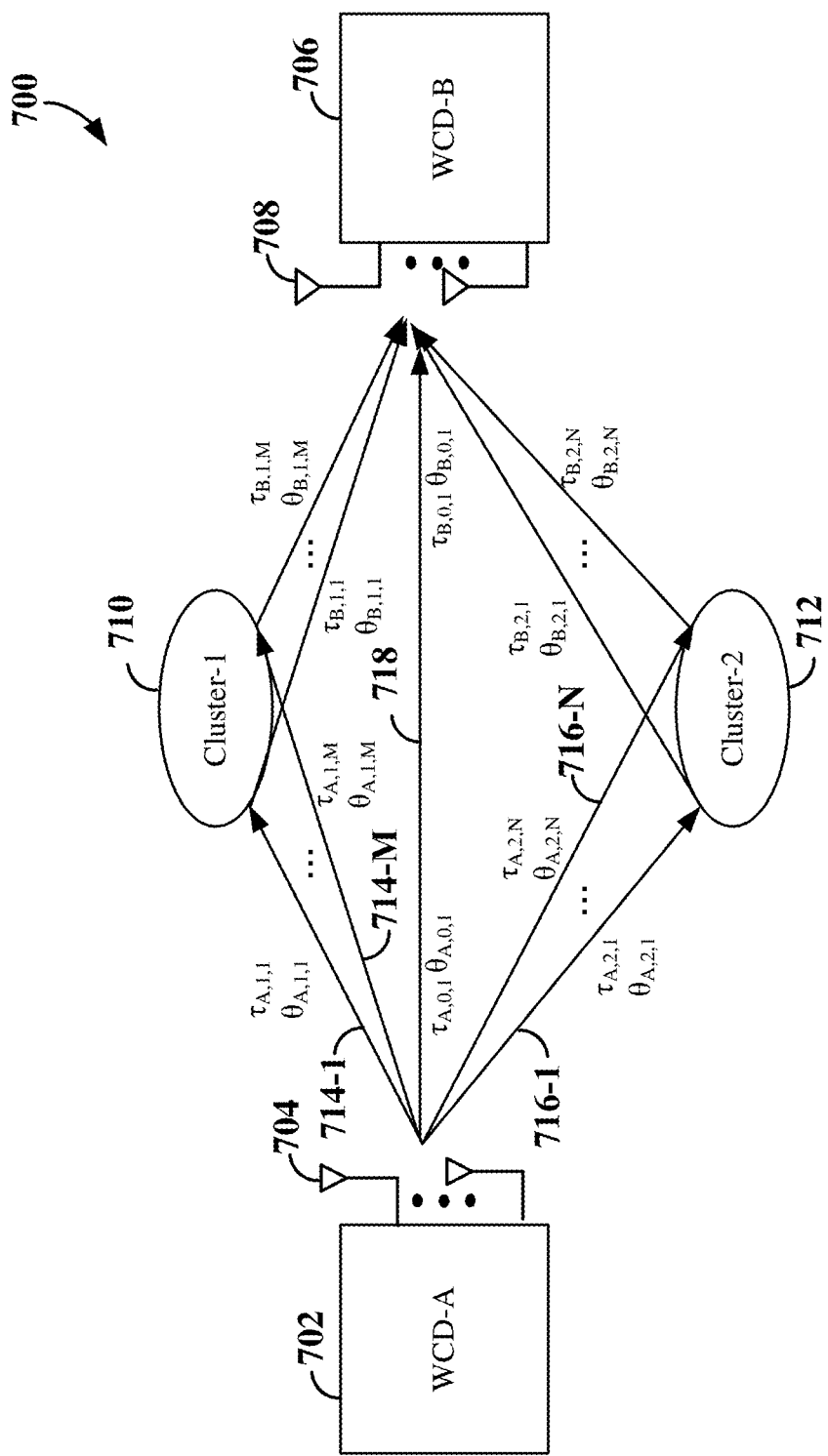
FIG. 7 is a diagram illustrating a bistatic communication channel model between wireless communication devices according to some aspects.

FIG. 7 is a diagram illustrating a bistatic communication channel model 700 between wireless communication devices 702 and 706 according to some aspects. Each of the wireless communication devices (WCD-A) 702 and (WCD-B) 706 may include an antenna array 704 and 708, respectively, including a plurality of antennas for communication of messages (e.g., control and/or data) therebetween. In some examples, each wireless communication device 702 and 706 may include a half-duplex communication system and full-duplex radar system (or lidar system).

In some examples, each of the wireless communication devices 702 and 706 may be a UE. For example, the UEs 702 and 706 may correspond to any of the sidelink (e.g., V2X) devices, D2D devices, or other UEs shown in any of FIGS. 1 and/or 3-6. In other examples, one of the wireless communication devices (e.g., wireless communication device 702) may be a base station and the other wireless communication device 706 may be a UE. For example, the base station 702 may correspond to any of the base stations (e.g., eNB, gNB, TRP, etc.) shown in any of FIGS. 1 and/or 3. In addition, the UE 706 may correspond to any of the UEs or other scheduled devices shown in any of FIGS. 1 and/or 3-6. Each of the wireless communication devices 702 and 706 may further include a JCR system as shown in FIG. 6A or FIG. 6B.

The bistatic communication channel model 700 illustrates a clustered delay line (CDL) between the wireless communication devices 702 and 706 that may be observed by monostatic ranging systems (e.g., radar or lidar) at each of the wireless communication devices 702 and 706. For example, there may $N_{cl}$ clusters (also referred to herein as scatterers), two of which 710 and 712 are shown for convenience. Each $i^{th}$ cluster (e.g., cluster 710 or 712) may reflect $N_{ray,i}$ rays between the wireless communication devices 702 and 706. For example, Cluster-1 710 may reflect rays 714-1 . . . 714-M and Cluster-2 712 may reflect rays 716-1 . . . 716-N. Each $i^{th}$ ray may have a respective delay $\tau_{i,\ell} = \tau_{A,i,\ell} + \tau_{B,i,\ell}$, a respective angle of arrival (AoA) $\phi_{i,\ell}^\gamma = \theta_{B,i,\ell}$, angle of departure (AoD) $\phi_{i,l}^\gamma = \theta_{A,i,l}$, and complex amplitude $\alpha_{i,\ell}$ that depends on the path loss, bistatic radar cross-section (RCS) (or lidar cross-section), and Doppler effect.

For example, ray 714-1 has a delay of $\tau_{1,1} = \tau_{A,1,1} + \tau_{B,1,1}$ and ray 714-M has a delay of $\tau_{1,M} = \tau_{A,1,M} + \tau_{B,1,M}$. In addition, ray 714-1 has an AOD of $\phi_{1,1}^\gamma = \theta_{A,1,1}$ and an AOA of $\phi_{1,1}^\gamma = \theta_{B,1,1}$, while ray 714-M has an AOD of $\phi_{1,M}^\gamma = \theta_{A,1,M}$ and an AOA of $\phi_{1,M}^\gamma = \theta_{B,1,M}$. Similarly, ray 716-1 has a delay of $\tau_{2,1} = \tau_{A,2,1} + \tau_{B,2,1}$ and ray 714-N has a delay of $\tau_{2,N} = \tau_{A,2,N} + \tau_{B,2,N}$. In addition, ray 714-1 has an AOD of $\phi_{2,1}^\gamma = \theta_{A,2,1}$ and an AOA of $\phi_{2,1}^\gamma = \theta_{B,2,1}$, while ray 714-N has an AOD of $\phi_{2,N}^\gamma = \theta_{A,2,N}$ and an AOA of $\phi_{2,N}^\gamma = \theta_{B,2,N}$. There may also be a line of sight (LOS) ray 718 that has a delay of $\tau_{0,1} = \tau_{A,0,1} + \tau_{B,0,1}$, an AOD of $\phi_{0,1}^\gamma = \theta_{A,0,1}$ and an AOA of $\phi_{0,1}^\gamma = \theta_{B,0,1}$. The LOS ray 718 is associated with a wireless communication device scatterer (e.g., WCD-A 702 or WCD-B 706).

Then, the CDL with filter p(t) that includes the effects of pulse shaping and analog/digital filtering is given by:

$$H(\tau,t) = \sum_i^{N_{cl}} \sum_\ell^{N_{ray,i}} \alpha_{i,\ell}(t) a_r(\phi_{i,\ell}^\gamma) a_t^H(\phi_{i,\ell}^t) p(t - \tau_{i,\ell})$$ (Equation 1)

The monostatic ranging system at WCD-A 702 may observe only $\tau_{A,i,\ell}, \theta_{A,i,\ell}$ for some of the detected clusters (scatterers) present the bistatic communication channel. In addition, the monostatic ranging system at WCD-B 706 may observe only $\tau_{B,i,\ell}, \theta_{B,i,\ell}$ for some of the detected clusters (scatterers) present the bistatic communication channel. In some examples, not all of the monostatic clusters may be present in the bistatic communication channel model 700. Additionally, not all bistatic clusters may be detectable by both monostatic ranging systems (e.g., due to blockage or different bistatic and monostatic reflectivity coefficients (RCS) of the scattering clusters).

However, there may be a good correlation of the clusters, delays, AoAs, and AoDs per cluster, the rays per cluster, and the strength of the cluster. Therefore, in various aspects of the disclosure, the WCD-B 706 may provide ranging feedback information relating to $\tau_{B,i,\ell}, \theta_{B,i,\ell}$ to WCD-A 702 to enable WCD-A 702 to determine the bistatic channel information for the bistatic channel between WCD-A 702 and WCD-B 706.

Figure 8:
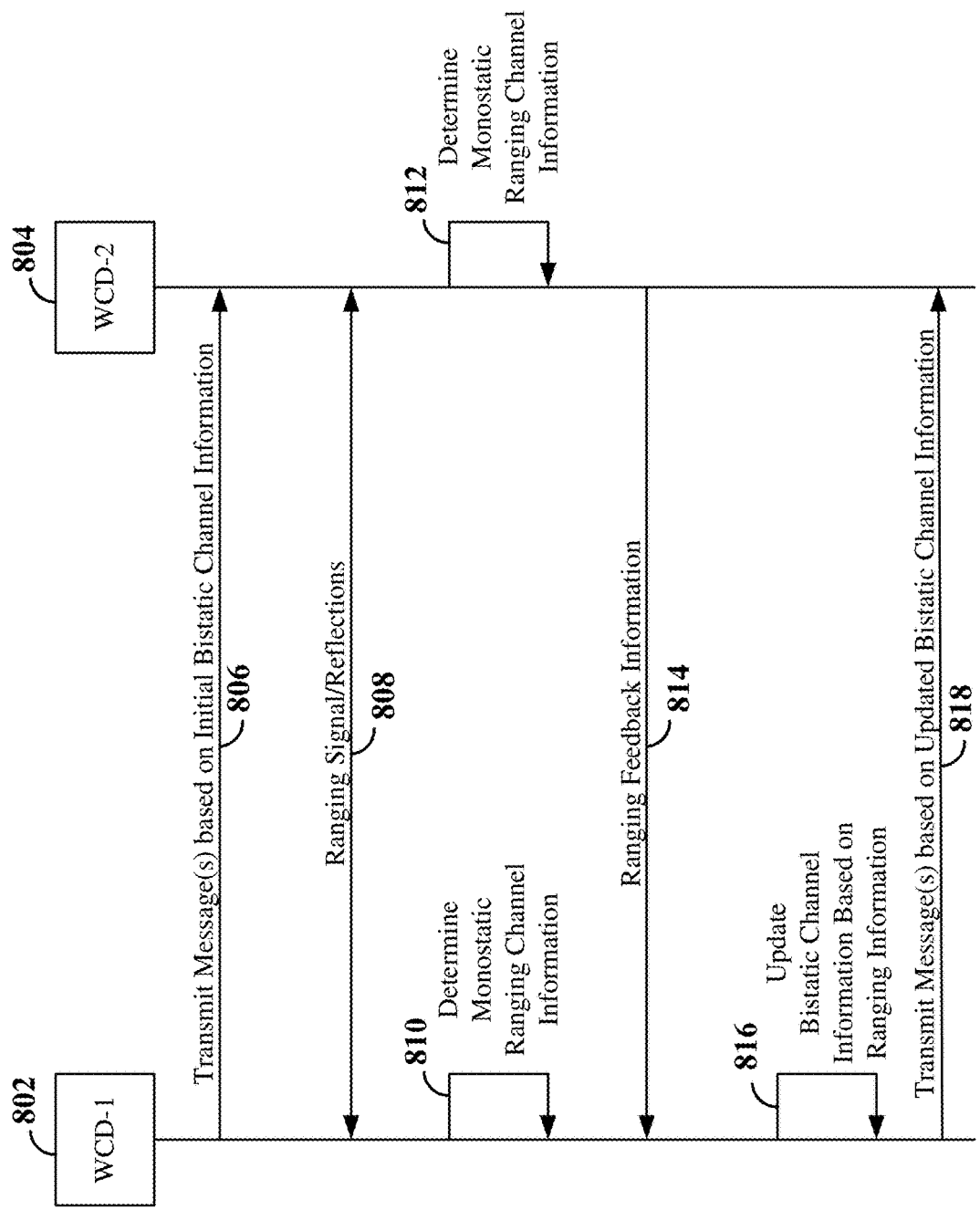
FIG. 8 is a signaling diagram illustrating exemplary signaling for bistatic channel estimation based on monostatic ranging channel information obtained by each of the wireless communication devices according to some aspects.

FIG. 8 is a signaling diagram illustrating exemplary signaling between wireless communication devices 802 and 804 for bistatic channel estimation based on monostatic ranging channel information obtained by each of the wireless communication devices 802 and 804 according to some aspects. In some examples, each of the wireless communication devices 802 and 804 may be a UE. For example, the UEs 802 and 804 may correspond to any of the sidelink (e.g., V2X) devices, D2D devices, or other UEs shown in any of FIGS. 1 and/or 3-7. In other examples, one of the wireless communication devices (e.g., wireless communication device 802) may be a base station and the other wireless communication device 804 may be a UE. For example, the base station 802 may correspond to any of the base stations (e.g., eNB, gNB, TRP, etc.) shown in any of FIGS. 1 and/or 3. In addition, the UE 804 may correspond to any of the UEs or other scheduled devices shown in any of FIGS. 1 and/or 3-7. Each of the wireless communication devices 802 and 804 may further include a JCR system as shown in FIG. 6A or FIG. 6B.

At 806, a first wireless communication device (WCD-1) 802 transmits one or more messages (e.g., sidelink (e.g., V2X) messages or cellular (Uu) messages) over a bistatic communication channel to a second wireless communication device (WCD-2) 804. The message(s) may include one or more reference signals, control information, and/or data. The message(s) may be transmitted based on initial bistatic channel information.

At 808, each of the WCD-1 802 and the WCD-2 804 may transmit one or more respective ranging signals. For example, WCD-1 802 may transmit one or more ranging signals (e.g., radar signals or lidar signals/light) that may be reflected off WCD-2 804 and/or one or more scatterers as reflected ranging signals (e.g., radar echoes or reflected light). In addition, WCD-2 804 may transmit one or more ranging signals that may be reflected off WCD-1 802 and/or one or more scatterers as reflected ranging signals. For example, each of WCD-1 802 and WCD-2 804 may include a ranging device (or common/shared communication/ranging device) that transmits a ranging signal periodically at a high rate to sense the environment. The ranging signal may be reflected by surrounding objects (e.g., the other WCD and/or one or more scatterers), and the resulting reflected ranging signals may be received by the ranging device in full-duplex configuration. Thus, WCD-1 802 may receive the reflected ranging signals reflected off WCD-2 804 and/or other scatterers, and WCD-2 804 may receive the reflected ranging signals reflected off WCD-1 802 and/or other scatterers.

At 810 and 812, each of the WCD-1 802 and WCD-2 804 may estimate a respective monostatic ranging channel (e.g., as described above in connection with FIG. 7). For example, the WCD-1 802 may estimate first monostatic ranging channel information based on the received reflected ranging signals at WCD-1 802 and the WCD-2 804 may estimate second monostatic ranging channel information based on the received reflected ranging signals at WCD-2 804. Each of the first and second monostatic ranging channel information may include one or more ranging channel parameters. For example, the ranging channel parameters may include monostatic delay information (e.g., $\tau$) and/or monostatic angular information (e.g., AoA, corresponding to the azimuth and elevation of received reflected ranging signals). In some examples, the monostatic delay information may include a delay profile that corresponds to a delay spread that indicates a time interval during which the reflected ranging signals with significant energy (e.g., above a threshold) arrive. The delay spread may be due to, for example, the multipath reflections of the ranging signal. In addition, the monostatic angular information may include an angular profile that corresponds to an angular spread that indicates a range of AoA (e.g., azimuth and elevation) values of the received reflected ranging signals.

In other examples, the monostatic delay information may include an average delay. The average delay may correspond to a root mean square delay, which is the standard deviation (or root-mean-square) value of the delay of reflections, weighted proportional to the energy in the reflected waves (reflected ranging signals). In addition, the monostatic angular information may include average angular information, which may correspond to root mean square angular information, which is the standard deviation (or root-mean-square) value of the azimuth and elevation of reflections, weighted proportional to the energy in the reflected waves (reflected ranging signals).

In some examples, the first and second monostatic ranging channel information may include respective monostatic delay information, monostatic angular information, and/or monostatic Doppler information. For example, the first and second monostatic ranging channel information may include a delay profile, a Doppler profile, and an angular profile. For example, the Doppler profile may include a Doppler shift profile that indicates a Doppler spread of the two-way monostatic ranging channel between WCD-1 802 and WCD-2 804. In other examples, the first and second monostatic ranging channel information may include an average delay, an average Doppler shift (e.g., based on the Doppler profile), and average angular information.

In some examples, the first and second monostatic ranging channel information may include respective cluster information associated with one or more respective clusters (scatterers) detected by each of the first and second wireless communication devices 802 and 804. For example, the first monostatic ranging channel information may include first cluster information associated with one or more first scatterers detected by the WCD-1 802 and the second monostatic ranging channel information may include second cluster information associated with one or more second scatterers detected by the WCD-2 804.

The cluster information may include, for example, respective delay information and/or angular information or respective delay, angular, and/or Doppler information for each of one or more detected scatterers. In an example, the cluster information may include the detected scatterers with one or more of their respective average delay or average angular information (e.g., AoA, including the azimuth and elevation) within a particular (e.g., a predetermined) delay spread or angular spread, respectively. In some examples, the cluster information may include the average delay and/or average angular information or the average delay, average angular information, and/or average Doppler information (e.g., average Doppler shift) of each of the detected scatterers included in the cluster information. In some examples, the cluster information may include the delay spread and/or angular spread or the delay spread, the angular spread, and/or the Doppler spread of each of the detected scatterers included in the cluster information.

At 814, the WCD-2 804 may transmit ranging feedback information to the WCD-1 802. The ranging feedback information may be based on the second monostatic ranging channel information obtained by the WCD-2 804. In some examples, the ranging feedback information may include the ranging channel information and/or the cluster information obtained by the WCD-2 804 at 812.

At 816, the WCD-1 802 may update the bistatic channel information based on the ranging information (e.g., the first monostatic ranging channel information and the ranging feedback information) associated with each of WCD-1 802 and WCD-2 804. In some examples, the WCD-1 802 may associate the first cluster information of the first monostatic ranging channel information with the second cluster information received in the ranging feedback information to determine the updated bistatic channel information. For example, the WCD-1 802 may associate the first and second cluster information based on a location and orientation of the WCD-2 804 with respect to WCD-1 802. In some examples, the location and orientation of the WCD-2 804 may be the absolute location and orientation or the relative location and orientation. For example, the WCD-2 804 may transmit the absolute location and orientation of WCD-2 804 as part of the ranging feedback information or in a separate message. As another example, the WCD-1 802 may determine the relative location and orientation of WCD-2 804 using, for example, one or more sensors (e.g., ranging sensor or camera) on the WCD-1 802.

In addition, the WCD-1 802 may associate the first cluster information with the second cluster information based on the location and orientation of WCD-1 802. For example, the WCD-1 802 may determine a respective first location for each of the one or more first scatterers associated with the first cluster information based on the location and orientation of the WCD-1 802 and the first cluster information. In addition, the WCD-1 802 may determine a respective second location for each of the one or more second scatterers associated with the second cluster information based on the location and orientation of the WCD-2 804 and the second cluster information.

The WCD-1 802 may then associate respective first scatterers with respective second scatterers based on the respective first and second locations to identify one or more bistatic channel scatterers. Here, the bistatic channel scatterers are scatterers included in the bistatic communication channel model. The WCD-1 802 may then determine the updated bistatic channel information based on the bistatic channel scatterers. In some examples, the updated bistatic channel information may include at least one of bistatic delay information or bistatic angular information corresponding to each of the one or more bistatic channel scatterers. For example, the updated bistatic channel information may include one or more of a respective average delay, respective average Doppler shift, or respective average angular information corresponding to each of the one or more bistatic channel scatterers or one or more of a respective delay spread, respective Doppler spread, or respective angular spread corresponding to each of the one or more bistatic channel scatterers.

In some examples, the updated bistatic channel information may include link information indicating whether a communication link between WCD-1 802 and WCD-2 804 (e.g., over which the message is transmitted at 806) is a line of sight (LOS) link or a non-LOS (NLOS) link. For example, the WCD-1 802 may identify a LOS link when, for a bistatic channel scatter corresponding to WCD-2 804 (e.g., WCD-2 804 is one of the bistatic channel scatterers), the first location of a first scatterer corresponding to the bistatic channel scatterer matches a corresponding second location of a second scatterer corresponding to the bistatic channel scatterer (e.g., based on the determined size of the scatterer). The WCD-1 802 may further identify a NLOS link when no LOS scatterer association is found for the one or more bistatic channel scatterers (e.g., the WCD-2 804 is not one of the bistatic channel scatterers).

At 818, the WCD-1 802 may transmit one or more message(s) based on the updated bistatic channel information. For example, the WCD-1 802 may adjust a DMRS density associated with transmission of a message to WCD-2 804 based on the respective delay spread and respective Doppler spread of at least one of the bistatic channel scatterers. As another example, the WCD-1 802 may select a beam (e.g., beamforming parameters indicative of a beam direction and/or beam width) or a precoding matrix for transmission of a message to WCD-2 804 based on the respective average angular information and respective angular spread of at least one of the bistatic channel scatterers. It should be understood that aspects described herein may be applicable to any frequency range (FR), including FR1, FR2, or other FR.

In some examples, the WCD-1 802 may track each of the bistatic channel clusters over time using one or more snapshots (e.g., ranging signal transmission/ranging echo receptions) of the WCD-1 802 and WCD-2 804 to identify a respective cluster motion of each of the bistatic channel scatterers. Based on the respective cluster motion of at least one of the bistatic channel scatterers, the WCD-1 802 may further adjust one or more of a beam (e.g., beamforming parameters indicative of a beam direction and/or beam width), precoding matrix, or DMRS density associated with transmission of a message to WCD-2 804. For example, each of WCD-1 802 and WCD-2 804, and at least one of the bistatic channel scatterers may be a V-UE scatterer, and the monostatic ranging of each of WCD-1 802 and WCD-2 804 may track the location of the V-UE scatterer with respect to the mobility of WCD-1 802 and WCD-2 804.

In some examples, the WCD-1 802 may adjust one or more of a subcarrier spacing, cyclic prefix length, transmission bandwidth, or a rate-matching parameter associated with transmission of a message to WCD-2 804 based on the updated bistatic channel information.

For a LOS link, the WCD-1 802 may adjust a time synchronization of the LOS link based on the respective average delay or respective delay spread of at least one of the bistatic channel scatterers. For example, the WCD-1 802 may adjust the time synchronization based on the delay (e.g., average delay or delay spread) for high subcarrier spacing (SCS) and low cyclic prefix (CP) length messages. In addition, the WCD-1 802 may adjust the time synchronization when the range and delay estimation have a high resolution (e.g., 15 cm resolution), which may result in tighter time synchronization that can be tracked over time. In some examples, the WCD-1 802 may further determine to switch to a higher SCS/low CP length transmission to perform fine-tuning of the time synchronization. In other LOS link examples, based on the location and spread of the WCD-2 804 bistatic channel scatterer, the WCD-1 802 may adjust one or more of a beam width, transmit power, and transmission scheme (e.g., transmit diversity scheme to create frequency diversity, etc.). For example, if the bistatic channel information indicates a high delay spread, this may lead to a frequency selective channel, and the WCD-1 802 may adjust the transmit diversity scheme to reduce the frequency selectivity of the bistatic communication channel.

In examples in which the WCD-1 802 determines that the communication link is a NLOS link, the WCD-1 802 may determine an association matrix indicating a respective association between each of the first and second scatterers and adjust at least one of a transmit waveform and/or a beamforming parameter (e.g., beam direction or beam width) based on the association matrix. For example, the $(i,j)^{th}$ element of the association matrix may be a one if there is an association between the $i^{th}$ first scatterer and the $j^{th}$ second scatterer and a zero if there is no association. In some examples, the association matrix may be determined to achieve low variance of the estimated location and orientation of the second wireless communication device (e.g., with respect to the first wireless communication device) among the different scatterers for multiple snapshots (e.g., multiple ranging signal transmissions/ranging echo receptions) and to further produce a minimum estimated error covariance of the tracked location and orientation of the second wireless communication device over the multiple snapshots. Based on the associated scatterers (e.g., the scatterers associated with a one in the association matrix), the WCD-1 802 may adjust the transmit waveform and/or beamforming parameter. The association matrix may further be utilized to estimate the location and orientation of the WCD-2 804 (e.g., based on the associated scatterers in the association matrix). In addition, the tracked location and orientation of the WCD-2 804 may further be utilized to synchronize the WCD-1 802 and the WCD-2 804.

Figure 9:
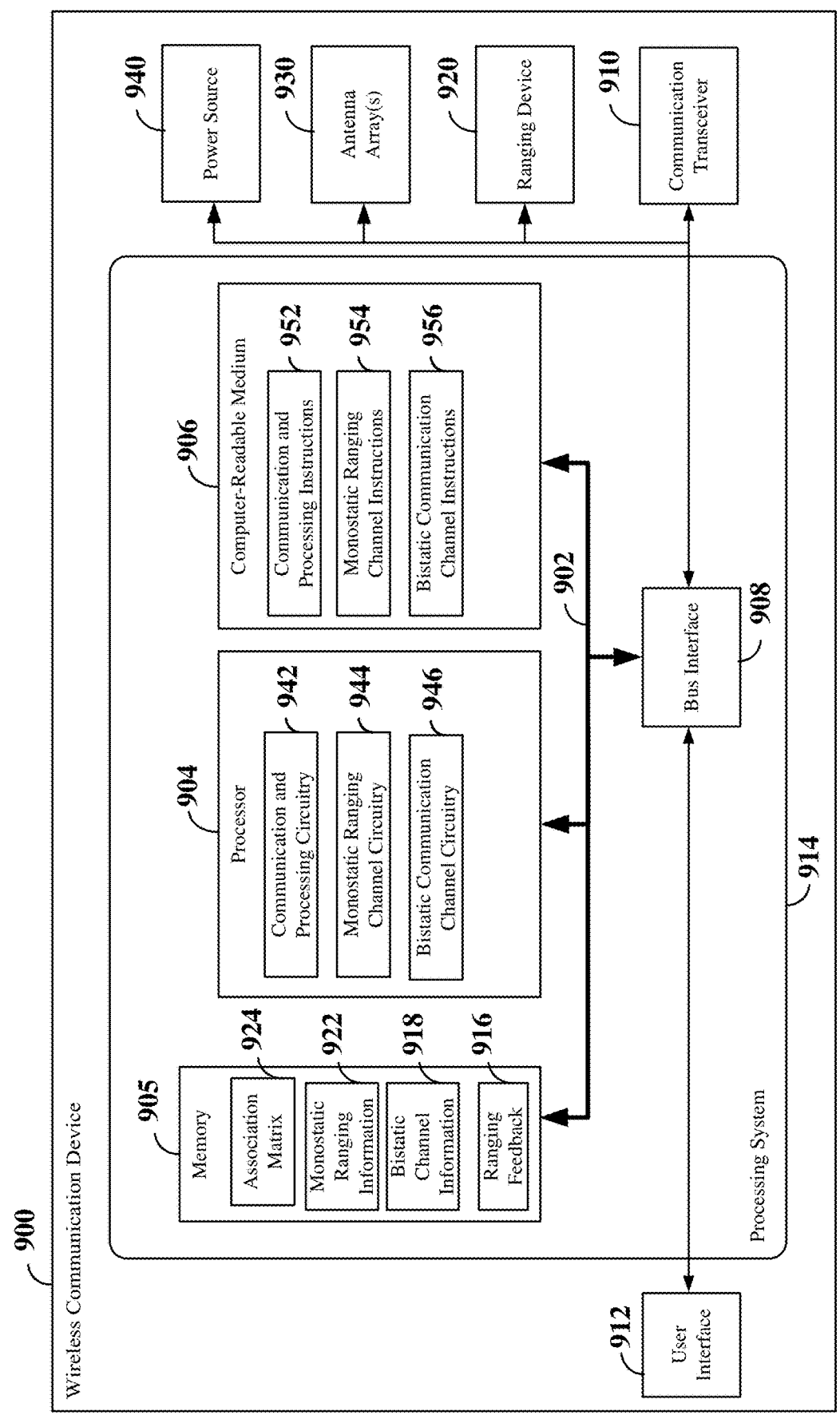
FIG. 9 is a block diagram illustrating an example of a hardware implementation for a wireless communication device employing a processing system according to some aspects.

FIG. 9 is a block diagram illustrating an example of a hardware implementation for a wireless communication device 900 employing a processing system 914. For example, the wireless communication device 900 may correspond to a sidelink device, such as a V2X device, D2D device or other UE or wireless communication device configured for sidelink or D2D communication, as shown and described above in reference to FIGS. 1 and/or 3-8. The wireless communication device 900 may further correspond to a base station (e.g., an eNB, gNB, TRP, etc.), as shown and described above in reference to FIGS. 1 and/or 3.

The wireless communication device 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in the wireless communication device 900, may be used to implement any one or more of the processes and procedures described below.

The processor 904 may in some instances be implemented via a baseband or modem chip and in other implementations, the processor 904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902, a communication transceiver 910, one or more antenna arrays 930, and a power source 940 (e.g., a battery and power control circuit). The communication transceiver 910 provides a communication interface or a means for communicating with various other apparatus over a transmission medium (e.g., air interface). The antenna array(s) 930 are coupled to the communication transceiver 910 and provide a means for beamforming to communicate via transmit/receive beams. The bus interface 908 further provides an interface between the bus 902 and a ranging device 920 (e.g., which may be either a radar transceiver or a lidar system, such as a laser and optics). The ranging device 920 provides a means for transmitting ranging signals and receiving reflected ranging signals. In some examples, the ranging device 920 may be configured to operate in a full-duplex manner Although not shown, the ranging device 920 may be coupled to a ranging antenna/antenna array. In some examples, a common/shared transceiver may be used for both communication and ranging. Depending upon the nature of the apparatus, a user interface 912 (e.g., keypad, display, touch screen, speaker, microphone, control knobs, etc.) may also be provided. Of course, such a user interface 912 is optional, and may be omitted in some examples.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store ranging channel feedback (Ranging feedback) 916, bistatic channel information (Bistatic Channel Information) 918, monostatic ranging channel information (Monostatic Ranging Information) 924, and an association matrix (Association Matrix) 924, which may used by the processor 904 in bistatic channel estimation and updating one or more bistatic communication parameters based on the bistatic channel estimation.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include communication and processing circuitry 942, configured to communicate with one or more sidelink devices (e.g., other UEs) via respective sidelinks (e.g., PC5 interfaces) or one or more UEs via a Uu link. In addition, the communication and processing circuitry 942 may be configured to communicate with a base station (e.g., gNB or eNB) via a Uu link. In some examples, the communication and processing circuitry 942 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 942 may include one or more transmit/receive chains.

In some implementations where the communication involves receiving information, the communication and processing circuitry 942 may obtain information from a component of the wireless communication device 900 (e.g., from the communication transceiver 910 that receives the information via radio frequency signaling or some other type of signaling suitable for the applicable communication medium), process (e.g., decode) the information, and output the processed information. For example, the communication and processing circuitry 942 may output the information to another component of the processor 904, to the memory 905, or to the bus interface 908. In some examples, the communication and processing circuitry 942 may receive one or more of signals, messages, other information, or any combination thereof. In some examples, the communication and processing circuitry 942 may receive information via one or more channels. In some examples, the communication and processing circuitry 942 may include functionality for a means for receiving. In some examples, the communication and processing circuitry 942 may include functionality for a means for processing, including a means for demodulating, a means for decoding, etc.

In some implementations where the communication involves sending (e.g., transmitting) information, the communication and processing circuitry 942 may obtain information (e.g., from another component of the processor 904, the memory 905, or the bus interface 908), process (e.g., modulate, encode, etc.) the information, and output the processed information. For example, the communication and processing circuitry 942 may output the information to the communication transceiver 910 (e.g., that transmits the information via radio frequency signaling or some other type of signaling suitable for the applicable communication medium). In some examples, the communication and processing circuitry 942 may send one or more of signals, messages, other information, or any combination thereof. In some examples, the communication and processing circuitry 942 may send information via one or more channels. In some examples, the communication and processing circuitry 942 may include functionality for a means for sending (e.g., a means for transmitting). In some examples, the communication and processing circuitry 942 may include functionality for a means for generating, including a means for modulating, a means for encoding, etc.

In some examples, the communication and processing circuitry 942 may be configured to transmit a ranging signal via the ranging device 920 from the wireless communication device 900 (e.g., a transmitting/first wireless communication device) to another wireless communication device (e.g., a receiving/second wireless communication device). The communication and processing circuitry 942 may further be configured to receive reflected ranging signals based on the ranging signal via the ranging device 920.

The communication and processing circuitry 942 may further be configured to receive ranging feedback information 916 from the second wireless communication device via the communication transceiver 910 and antenna array(s) 930. The ranging feedback information 916 may be based on monostatic ranging information (e.g., second monostatic ranging channel information) obtained by the second wireless communication device. The communication and processing circuitry 942 may further be configured to store the ranging feedback information 916 within, for example, memory 905. In some examples, the ranging feedback information 916 may further include the absolute location and orientation of the second wireless communication device. In other examples, the communication and processing circuitry 942 may be configured to receive the absolute location and orientation of the second wireless communication device via a different message.

In some examples, the ranging feedback information 916 may include ranging channel information and/or cluster information. For example, the ranging channel information may include monostatic delay information and/or monostatic angular information (e.g., AoA, corresponding to the azimuth and elevation of received reflected ranging signals at the second wireless communication device) or delay, angular, and/or Doppler information. In some examples, the ranging channel information may include a delay spread and/or angular spread or a delay spread, angular spread, and/or Doppler spread. In other examples, the ranging channel information may include an average delay and/or average angular information or average delay, average angular information, and/or an average Doppler shift. In some examples, the cluster information may be associated with one or more clusters (scatterers) detected by the second wireless communication device. The cluster information may include, for example, respective delay information and/or angular information or respective delay, angular, and/or Doppler information for each of one or more detected scatterers. In some examples, the cluster information may include the average delay and/or average angular information or the average delay, average angular information, and/or average Doppler information (e.g., average Doppler shift) of each of the detected scatterers included in the cluster information. In some examples, the cluster information may include the delay spread and/or angular spread or the delay spread, the angular spread, and/or the Doppler spread of each of the detected scatterers included in the cluster information.

The communication and processing circuitry 942 may further be configured to transmit a message to the second wireless communication device via the communication transceiver 910 and antenna array(s) 930. The message may be a cellular (Uu) message or a sidelink (e.g., V2X messages) message. The message may include reference signal(s), control information, and/or data. In addition, the communication and processing circuitry 942 may further be configured to transmit an updated message (e.g., Uu or V2X message) via the communication transceiver 910 and antenna array(s) 930 to the second wireless communication device based on the bistatic channel information 918. The communication and processing circuitry 942 may further be configured to execute communication and processing instructions (software) 952 stored in the computer-readable medium 906 to implement one or more of the functions described herein.

The processor 904 may further include monostatic ranging channel circuitry 944, configured to operate together with the communication and processing circuitry 942 to generate and transmit, via the ranging device 920, a ranging signal and to receive reflected ranging signals based on the ranging signal. In some examples, the monostatic ranging channel circuitry 944 may be configured to generate and transmit ranging signals periodically at a high rate. The monostatic ranging channel circuitry 944 may further be configured to process the received reflected ranging signals to estimate the monostatic ranging channel information 922 (first monostatic ranging channel information) and store the monostatic ranging channel information 922 within, for example, memory 905. The monostatic ranging channel information 922 may include ranging channel parameters of the respective monostatic ranging channel between the wireless communication device 900 and each of a plurality of surrounding objects (e.g., scatterers).

The ranging channel parameters that may be estimated using the reflected ranging signals may include, for example, monostatic delay information and/or monostatic angular information (e.g., AoA, corresponding to the azimuth and elevation of received reflected ranging signals at the wireless communication device 900) or delay, angular, and/or Doppler information. In some examples, the ranging channel information may include a delay spread and/or angular spread or a delay spread, angular spread, and/or Doppler spread. In other examples, the ranging channel information may include an average delay and/or average angular information or average delay, average angular information, and/or an average Doppler shift. In some examples, the monostatic ranging channel information 922 may further include cluster information (e.g., first cluster information) associated with one or more clusters (scatterers) detected by the wireless communication device 900. The cluster information may include, for example, respective delay information and/or angular information or respective delay, angular, and/or Doppler information for each of one or more detected scatterers. In some examples, the cluster information may include the average delay and/or average angular information or the average delay, average angular information, and/or average Doppler information (e.g., average Doppler shift) of each of the detected scatterers included in the cluster information. In some examples, the cluster information may include the delay spread and/or angular spread or the delay spread, the angular spread, and/or the Doppler spread of each of the detected scatterers included in the cluster information. The monostatic ranging channel circuitry 944 may further be configured to execute monostatic ranging channel instructions (software) 954 stored in the computer-readable medium 906 to implement one or more of the functions described herein.

The processor 904 may further include bistatic communication channel circuitry 946, configured to determine the bistatic channel information 918 based on the ranging feedback information 916 and the monostatic ranging channel information 922 (e.g., the first monostatic ranging channel information) estimated by the monostatic ranging channel circuitry 944. The bistatic communication channel circuitry 946 may further be configured to store the bistatic channel information 918 within, for example, memory 905.

In some examples, the bistatic communication channel circuitry 946 may be configured to associate the first cluster information of the monostatic ranging channel information 922 with the second cluster information received in the ranging feedback information 916 to determine the bistatic channel information 918. For example, the bistatic communication channel circuitry 946 may be configured to associate the first and second cluster information based on a location and orientation of the second wireless communication device with respect to the first wireless communication device 900. In some examples, the location and orientation of the second wireless communication device may be the absolute location and orientation received by the communication and processing circuitry 942 or the relative location and orientation. In some examples, the bistatic communication channel circuitry 946 may be configured to determine the relative location and orientation of the second wireless communication device using, for example, one or more sensors (not shown) on the wireless communication device 900.

In addition, the bistatic communication channel circuitry 946 may associate the first cluster information with the second cluster information based on the location and orientation of the first wireless communication device 900. For example, the bistatic communication channel circuitry 946 may determine a respective first location for each of the one or more first scatterers associated with the first cluster information based on the location and orientation of the first wireless communication device 900 and the first cluster information. In addition, the bistatic communication channel circuitry 946 may determine a respective second location for each of the one or more second scatterers associated with the second cluster information based on the location and orientation of the second wireless communication device and the second cluster information in the ranging feedback information 916.

The bistatic communication channel circuitry 946 may then associate respective first scatterers with respective second scatterers based on the respective first and second locations to identify one or more bistatic channel scatterers. The bistatic communication channel circuitry 946 may then determine the bistatic channel information 918 based on the bistatic channel scatterers. For example, the bistatic channel information 918 may include at least one of bistatic delay information or bistatic angular information corresponding to each of the one or more bistatic channel scatterers. In some examples, the bistatic channel information 918 may include one or more of a respective average delay, respective average Doppler shift, respective average angular information corresponding to each of the one or more bistatic channel scatterers or one or more of a respective delay spread, respective Doppler spread, or respective angular spread corresponding to each of the one or more bistatic channel scatterers.

In some examples, the bistatic channel information 918 may further include link information indicating whether a communication link between the first wireless communication device 900 and the second wireless communication device is a line of sight (LOS) link or a non-LOS (NLOS) link. For example, the bistatic communication channel circuitry 946 may identify a LOS link when, for a bistatic channel scatter corresponding to the second wireless communication device, the first location of a first scatterer corresponding to the bistatic channel scatterer matches a corresponding second location of a second scatterer corresponding to the bistatic channel scatterer. The bistatic communication channel circuitry 946 may further identify a NLOS link when no LOS scatterer association is found for the one or more bistatic channel scatterers (e.g., the one or more bistatic channel scatterers do not include a LOS bistatic channel scatterer).

The bistatic communication channel circuitry 946 may further be configured to operate together with the communication and processing circuitry 942 to select one or more communication channel parameters (e.g., updated communication channel parameters) for a message to be transmitted by the communication and processing circuitry 942 to the second wireless communication device based on the bistatic channel information 918. In some examples, the bistatic communication channel circuitry 946 may be configured to adjust a density of a demodulation reference signal associated with transmission of the message based on the respective delay spread and the respective Doppler spread of at least one of the one or more bistatic channel scatterers. As another example, the bistatic communication channel circuitry 946 may be configured to operate together with the communication and processing circuitry 942 to transmit the message to the second wireless communication device using at least one of a beam or precoding matrix selected based on the respective average angular information and respective angular spread of at least one of the one or more bistatic channel scatterers. For example, the bistatic communication channel circuitry 946 may operate together with the communication and processing circuitry 942 to configure the antenna array(s) 930 to use a particular beam for transmission of the message.

In some examples, the bistatic communication channel circuitry 946 may be configured to track each of the one or more bistatic channel scatterers using additional monostatic ranging channel information and additional ranging feedback information to identify a respective cluster motion of at least one bistatic channel scatterer of the one or more bistatic channel scatterers. The bistatic communication channel circuitry 946 may further be configured to adjust one or more of a beam, precoding matrix, or density of a demodulation reference signal associated with transmission of the message based on the respective cluster motion of the at least one bistatic channel scatterer.

In some examples, the bistatic communication channel circuitry 946 may be configured to adjust at least one of a subcarrier spacing, cyclic prefix length, transmission bandwidth or a rate-matching parameter for transmission of the message based on the bistatic channel information 918.

For a LOS link, the bistatic communication channel circuitry 946 may be configured to adjust a time synchronization of the LOS link based on the respective average delay or respective delay spread of at least one bistatic channel scatterer of the one or more bistatic channel scatterers. For example, the bistatic communication channel circuitry 946 may adjust a time synchronization of the LOS link based on the respective average delay or respective delay spread of each of the one or more bistatic channel scatterers. As another example, the bistatic communication channel circuitry 946 may adjust one or more of a beam width, transmit power, or transmit diversity scheme based on the respective scatterer locations and the respective angular spread of at least one bistatic channel scatterer of the one or more bistatic channel scatterers. For example, the bistatic communication channel circuitry 946 may further be configured to operate together with the communication and processing circuitry 942 to control the power source 940 to modify the transmit power of the message.

In examples in which the communication link is a NLOS link, the bistatic communication channel circuitry 946 may determine the association matrix 924 indicating a respective association between each of the one or more first scatterers and the one or more second scatterers. The bistatic communication channel circuitry 946 may further store the association matrix 924 within, for example, memory 905. In addition, the bistatic communication channel circuitry 946 may further be configured to adjust at least one of transmit waveform or a beamforming parameter for transmission of the message based on the association matrix 924. The bistatic communication channel circuitry 946 may further be configured to execute bistatic communication channel instructions (software) 956 stored in the computer-readable medium 906 to implement one or more of the functions described herein.

Figure 10:
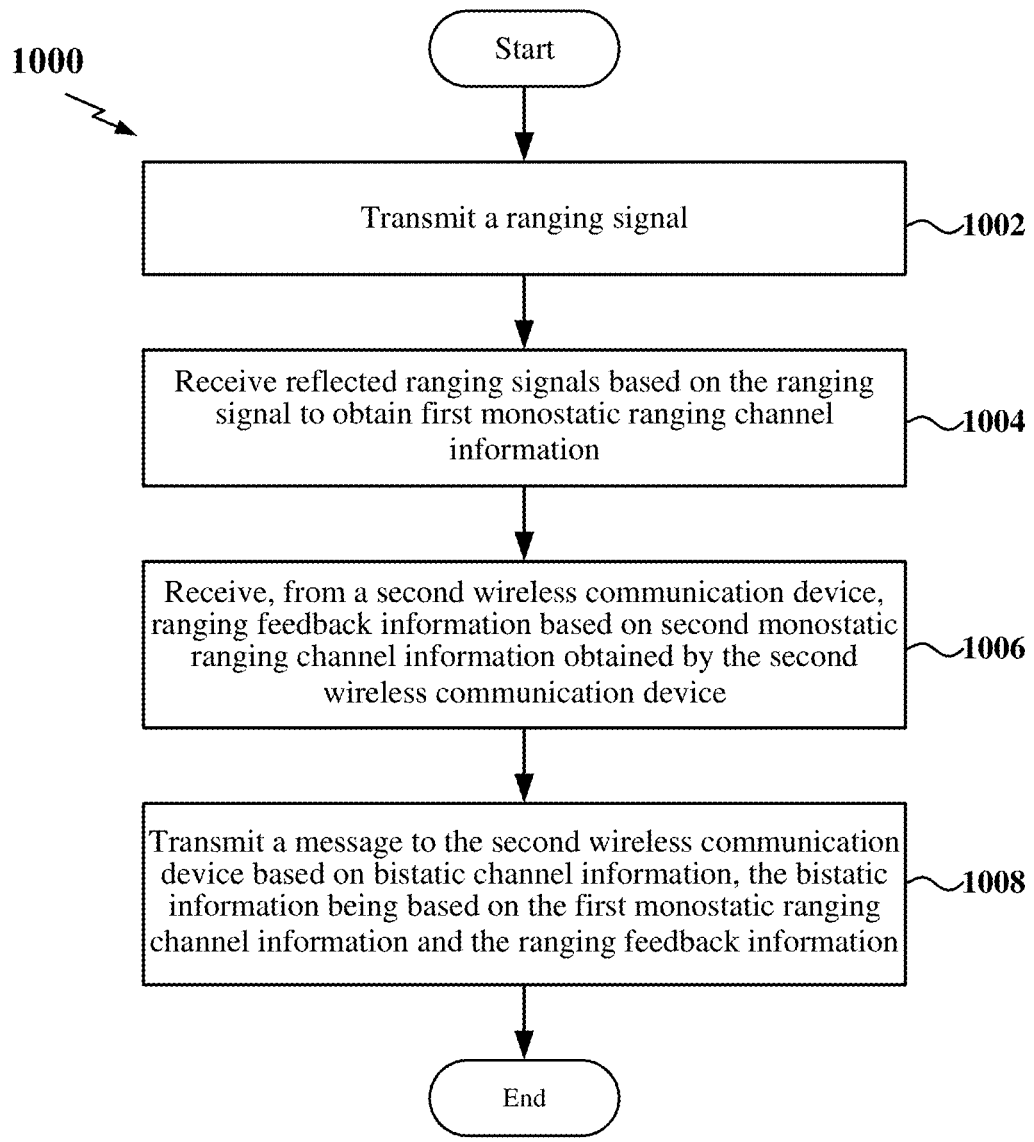
FIG. 10 is a flow chart of an exemplary method for bistatic channel estimation using ranging feedback according to some aspects.

FIG. 10 is a flow chart 1000 of an exemplary method for bistatic channel estimation using ranging feedback according to some aspects. As described below, some or all illustrated features may be omitted in a particular implementation within the scope of the present disclosure, and some illustrated features may not be required for implementation of all examples. In some examples, the method may be performed by the wireless communication device 900, as described above and illustrated in FIG. 9, by a processor or processing system, or by any suitable means for carrying out the described functions.

At block 1002, the wireless communication device (e.g., a first wireless communication device) may transmit a ranging signal. For example, the monostatic ranging channel circuitry 944, together with the ranging device 920, shown and described above in connection with FIG. 9, may provide a means to generate and transmit the ranging signal.

At block 1004, the first wireless communication device may receive reflected ranging signals based on the ranging signal to obtain first monostatic ranging channel information. In some examples, the first monostatic ranging channel information includes one or more ranging channel parameters. In some examples, the one or more ranging channel parameters include at least one of monostatic delay information or monostatic angular information corresponding to the reflected ranging signals. In some examples, the first monostatic ranging channel information includes first cluster information associated with one or more first scatterers detected by the first wireless communication device based on the reflected ranging signals. The first monostatic ranging information may include one or more of respective delay information or respective angular information associated with each of the one or more first scatterers. For example, the monostatic ranging channel circuitry 944, together with the ranging device 920, shown and described above in connection with FIG. 9 may provide a means to receive the reflected ranging signals and to obtain the first monostatic ranging channel information.

At block 1006, the first wireless communication device may receive, from a second wireless communication device, ranging feedback information based on second monostatic ranging channel information obtained by the second wireless communication device. In some examples, the ranging feedback information includes second cluster information associated with one or more second scatterers detected by the second wireless communication device. For example, the bistatic communication channel circuitry 946 and communication transceiver 910 shown and described above in connection with FIG. 9 may provide a means to receive the ranging feedback information.

At block 1008, the first wireless communication device may transmit a message to the second wireless communication device based on bistatic channel information, the bistatic channel information being based on the first monostatic ranging channel information and the ranging feedback information. For example, the bistatic communication channel circuitry 946, together with the communication and processing circuitry 942 and communication transceiver 910, shown and described above in connection with FIG. 9 may provide a means to transmit the message to the second wireless communication device based on the bistatic channel information.

In some examples, the first wireless communication device may associate the first cluster information with the second cluster information. In some examples, the first wireless communication device may associate the first cluster information with the second cluster information based on a location and an orientation of the second wireless communication device with respect to the first wireless communication device. In some examples, the location and the orientation include a relative location and a relative orientation of the second wireless communication device with respect to the first wireless communication device. In this example, the first wireless communication device may determine the relative location and the relative orientation using one or more sensors on the first wireless communication device. In some examples, the location and the orientation include an absolute location and an absolute orientation of the second wireless communication device with respect to the first wireless communication device. In this example, the first wireless communication device may receive the absolute location and the absolute orientation of the second wireless communication device within the ranging feedback information.

In some examples, the first wireless communication device may determine respective first locations of the one or more first scatterers based on the first cluster information and a first location and first orientation of the first wireless communication device. In addition, the first wireless communication device may determine respective second locations of the one or more second scatterers based on the ranging feedback information and the location and the orientation of the second wireless communication device with respect to the first wireless communication device. The first wireless communication device may further associate respective first scatterers of the one or more first scatterers with respective second scatterers of the one or more second scatterers based on the respective first locations and the respective second locations to identify one or more bistatic channel scatterers.

In some examples, the first wireless communication device may determine the bistatic channel information including at least one of bistatic delay information or bistatic angular information corresponding to each of the one or more bistatic channel scatterers. In some examples, the bistatic channel information includes one or more of a respective average delay, respective average Doppler shift, or respective average angular information corresponding to each of the one or more bistatic channel scatterers or one or more of a respective delay spread, respective Doppler spread, or respective angular spread corresponding to each of the one or more bistatic channel scatterers.

In some examples, the first wireless communication device may adjust a density of a demodulation reference signal associated with transmission of the message based on the respective delay spread and the respective Doppler spread of at least one bistatic channel scatterer of the one or more bistatic channel scatterers. In some examples, the first wireless communication device may transmit the message to the second wireless communication device using at least one of a beam or precoding matrix selected based on the respective average angular information and respective angular spread of at least one bistatic channel scatterer of the one or more bistatic channel scatterers. In some examples, the first wireless communication device may track each of the one or more bistatic channel scatterers using additional monostatic ranging channel information and additional ranging feedback information to identify a respective cluster motion of at least one bistatic channel scatterer of the one or more bistatic channel scatterers. In this example, the first wireless communication device may further adjust one or more of a beam, precoding matrix, or density of a demodulation reference signal associated with transmission of the message based on the respective cluster motion of the at least one bistatic channel scatterer. In some examples, the first wireless communication device may adjust at least one of a subcarrier spacing, cyclic prefix length, transmission bandwidth or a rate-matching parameter for transmission of the message based on the bistatic channel information.

In some examples, the bistatic channel information includes link information indicating whether a communication link between the first wireless communication device and the second wireless communication device is a line of sight (LOS) link or a non-LOS (NLOS) link. In some examples, the first wireless communication device may identify the LOS link between the first wireless communication device and the second wireless communication device in response to, for a bistatic channel scatterer of the one or more bistatic channel scatterers corresponding to the second wireless communication device, a respective first location of the first scatterer corresponding to the bistatic channel scatterer matching a respective second location of the second scatterer corresponding to the bistatic channel scatterer. In some examples, the first wireless communication device may adjust a time synchronization of the LOS link based on the respective average delay or respective delay spread of at least one bistatic channel scatterer of the one or more bistatic channel scatterers. In some examples, the first wireless communication device may adjust one or more of a beamwidth, transmit power, or transmit diversity scheme for transmission of the message based on respective scatterer locations and the respective angular spread of at least one bistatic channel scatterer of the one or more bistatic channel scatterers.

In some examples, the first wireless communication device may identify the NLOS link between the first wireless communication device and the second wireless communication device in response to the one or more bistatic channel scatterers lacking a LOS scatterer association. In this example, the first wireless communication device may determine an association matrix indicating a respective association between each of the one or more first scatterers and each of the one or more second scatterers and adjust at least one of a transmit waveform or a beamforming parameter for transmission of the message based on the association matrix.

Figure 11:
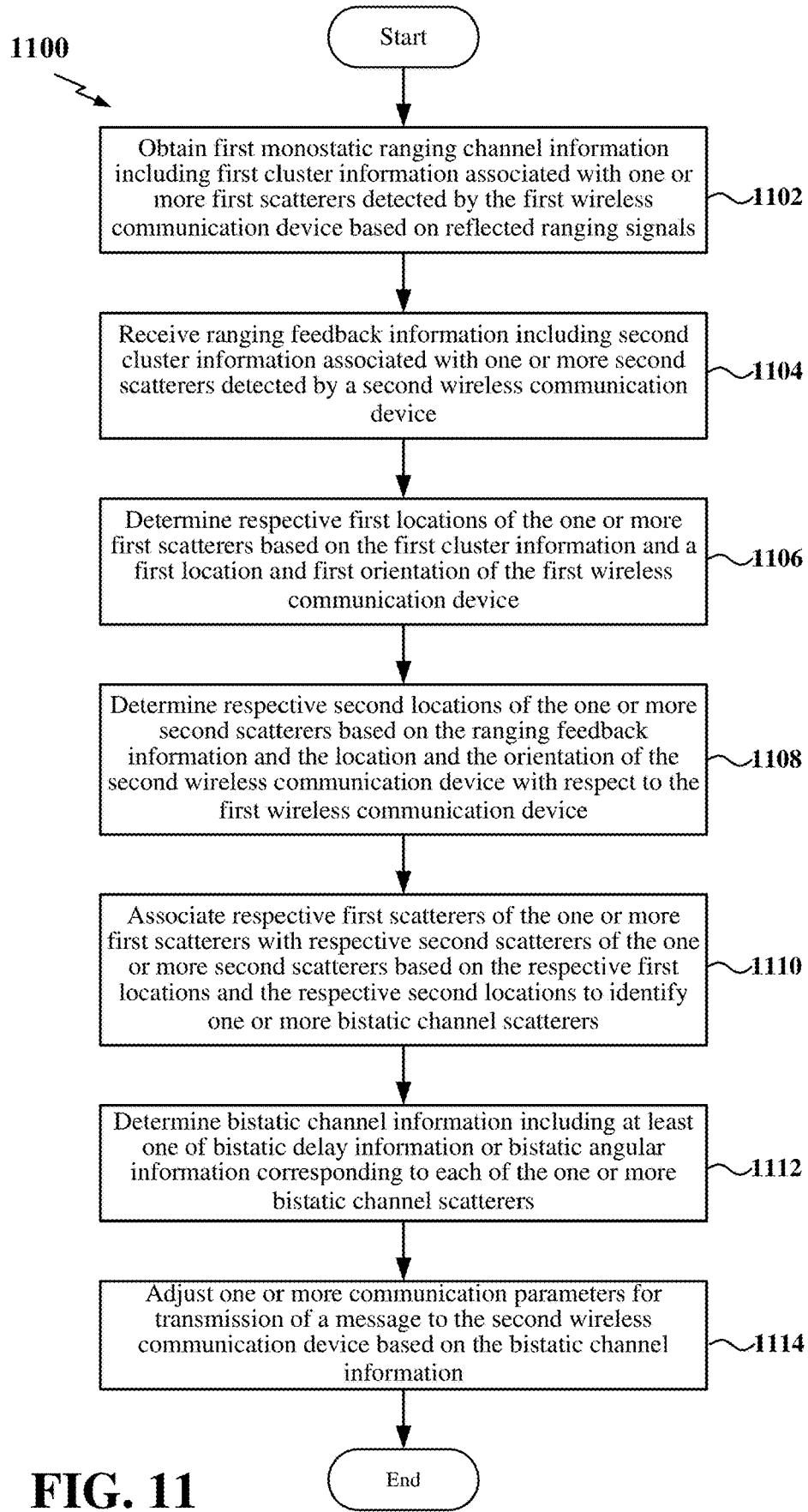
FIG. 11 is a flow chart of another exemplary method for bistatic channel estimation using ranging feedback according to some aspects.

FIG. 11 is a flow chart 1100 of another exemplary method for bistatic channel estimation using ranging feedback according to some aspects. As described below, some or all illustrated features may be omitted in a particular implementation within the scope of the present disclosure, and some illustrated features may not be required for implementation of all examples. In some examples, the method may be performed by the wireless communication device 900, as described above and illustrated in FIG. 9, by a processor or processing system, or by any suitable means for carrying out the described functions.

At block 1102, the wireless communication device (e.g., a first wireless communication device) may obtain first monostatic ranging channel information including first cluster information associated with one or more first scatterers detected by the first wireless communication device based on the reflected ranging signals. The first monostatic ranging information may include one or more of respective delay information or respective angular information associated with each of the one or more first scatterers. For example, the monostatic ranging channel circuitry 944 shown and described above in connection with FIG. 9 may provide a means to obtain the first monostatic ranging channel information.

At block 1104, the first wireless communication device may receive ranging feedback information including second cluster information associated with one or more second scatterers detected by a second wireless communication device. For example, the bistatic communication channel circuitry 946, together with the communication and processing circuitry 942 and communication transceiver 910, shown and described above in connection with FIG. 9 may provide a means to receive the ranging feedback information.

At block 1106, the first wireless communication device may determine respective first locations of the one or more first scatterers based on the first cluster information and a first location and first orientation of the first wireless communication device. For example, the bistatic communication channel circuitry 946 shown and described above in connection with FIG. 9 may provide a means to determine the respective first locations of the one or more first scatterers.

At block 1108, the first wireless communication device may determine respective second locations of the one or more second scatterers based on the ranging feedback information and the location and the orientation of the second wireless communication device with respect to the first wireless communication device. In some examples, the location and the orientation include a relative location and a relative orientation of the second wireless communication device with respect to the first wireless communication device. In this example, the first wireless communication device may determine the relative location and the relative orientation using one or more sensors on the first wireless communication device. In some examples, the location and the orientation include an absolute location and an absolute orientation of the second wireless communication device with respect to the first wireless communication device. In this example, the first wireless communication device may receive the absolute location and the absolute orientation of the second wireless communication device within the ranging feedback information. For example, the bistatic communication channel circuitry 946 shown and described above in connection with FIG. 9 may provide a means to determine the respective second locations of the one or more second scatterers.

At block 1110, the first wireless communication device may associate respective first scatterers of the one or more first scatterers with respective second scatterers of the one or more second scatterers based on the respective first locations and the respective second locations to identify one or more bistatic channel scatterers. For example, the bistatic communication channel circuitry 946 shown and described above in connection with FIG. 9 may provide a means to associate the first scatterers with the second scatterers.

At block 1112, the first wireless communication device may determine bistatic channel information including at least one of bistatic delay information or bistatic angular information corresponding to each of the one or more bistatic channel scatterers. In some examples, the bistatic channel information includes one or more of a respective average delay, respective average Doppler shift, or respective average angular information corresponding to each of the one or more bistatic channel scatterers or one or more of a respective delay spread, respective Doppler spread, or respective angular spread corresponding to each of the one or more bistatic channel scatterers. For example, the bistatic communication channel circuitry 946 shown and described above in connection with FIG. 9 may provide a means to determine the bistatic channel information.

At block 1114, the first wireless communication device may adjust one or more communication parameters for transmission of a message to the second wireless communication device based on the bistatic channel information. In some examples, the first wireless communication device may adjust a density of a demodulation reference signal associated with transmission of the message based on the respective delay spread and the respective Doppler spread of at least one bistatic channel scatterer of the one or more bistatic channel scatterers. In some examples, the first wireless communication device may transmit the message to the second wireless communication device using at least one of a beam or precoding matrix selected based on the respective average angular information and respective angular spread of at least one bistatic channel scatterer of the one or more bistatic channel scatterers. In some examples, the first wireless communication device may track each of the one or more bistatic channel scatterers using additional monostatic ranging channel information and additional ranging feedback information to identify a respective cluster motion of at least one bistatic channel scatterer of the one or more bistatic channel scatterers. In this example, the first wireless communication device may further adjust one or more of a beam, precoding matrix, or density of a demodulation reference signal associated with transmission of the message based on the respective cluster motion of the at least one bistatic channel scatterer. In some examples, the first wireless communication device may adjust at least one of a subcarrier spacing, cyclic prefix length, transmission bandwidth or a rate-matching parameter for transmission of the message based on the bistatic channel information. For example, the bistatic communication channel circuitry 946 shown and described above in connection with FIG. 9 may provide a means to adjust the one or more communication parameters.

Figure 12:
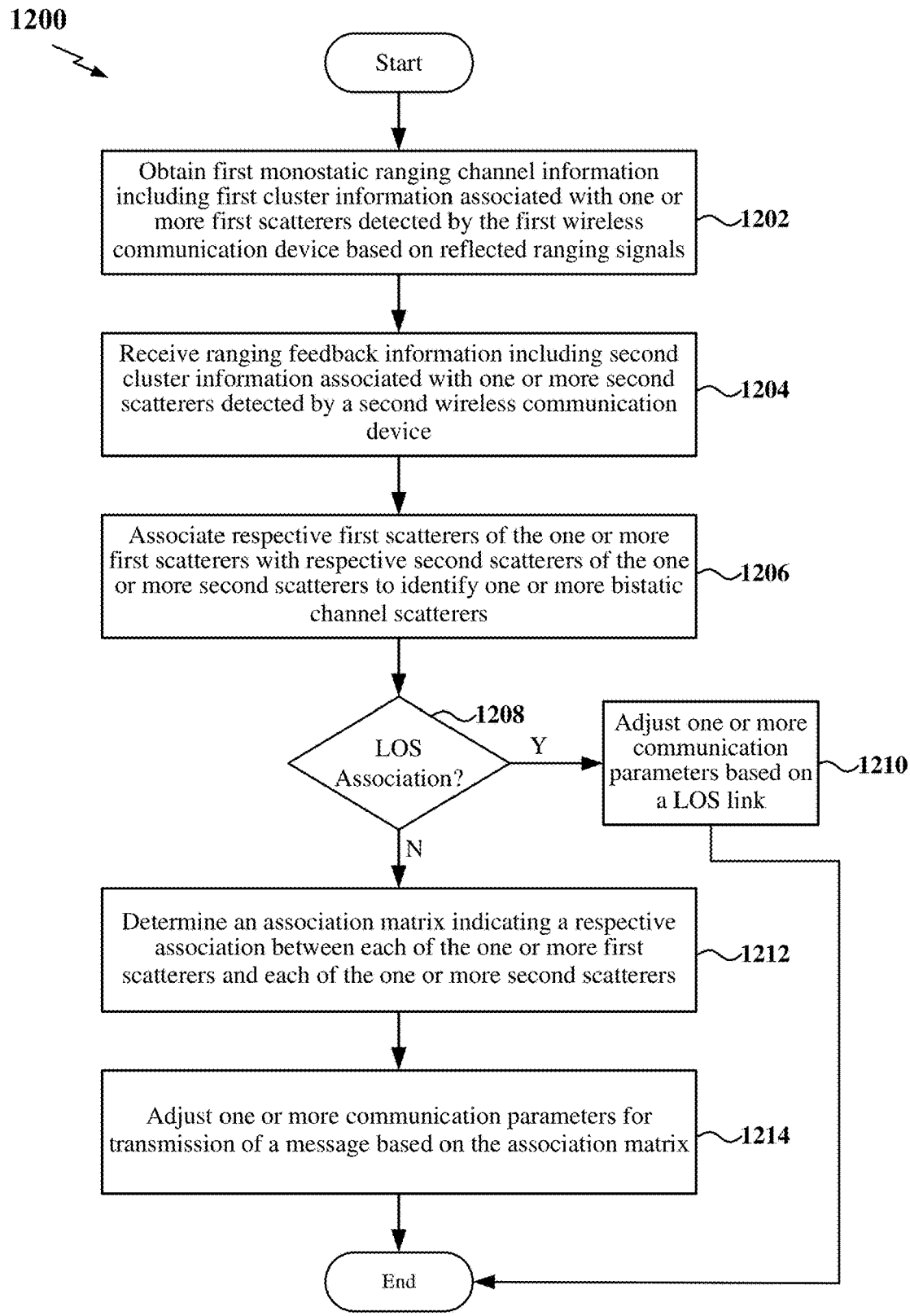
FIG. 12 is a flow chart of another exemplary method for bistatic channel estimation using ranging feedback according to some aspects.

FIG. 12 is a flow chart 1200 of another exemplary method for bistatic channel estimation using ranging feedback according to some aspects. As described below, some or all illustrated features may be omitted in a particular implementation within the scope of the present disclosure, and some illustrated features may not be required for implementation of all examples. In some examples, the method may be performed by the wireless communication device 900, as described above and illustrated in FIG. 9, by a processor or processing system, or by any suitable means for carrying out the described functions.

At block 1202, the wireless communication device (e.g., a first wireless communication device) may obtain first monostatic ranging channel information including first cluster information associated with one or more first scatterers detected by the first wireless communication device based on the reflected ranging signals. The first monostatic ranging information may include one or more of respective delay information or respective angular information associated with each of the one or more first scatterers. For example, the monostatic ranging channel circuitry 944 shown and described above in connection with FIG. 9 may provide a means to obtain the first monostatic ranging channel information.

At block 1204, the first wireless communication device may receive ranging feedback information including second cluster information associated with one or more second scatterers detected by a second wireless communication device. For example, the bistatic communication channel circuitry 946, together with the communication and processing circuitry 942 and communication transceiver 910, shown and described above in connection with FIG. 9 may provide a means to receive the ranging feedback information.

At block 1206, the first wireless communication device may associate respective first scatterers of the one or more first scatterers with respective second scatterers of the one or more second scatterers to identify one or more bistatic channel scatterers. In some examples, the first wireless communication device may determine respective first locations of the one or more first scatterers based on the first cluster information and a first location and first orientation of the first wireless communication device. In addition, the first wireless communication device may determine respective second locations of the one or more second scatterers based on the ranging feedback information and the location and the orientation of the second wireless communication device with respect to the first wireless communication device. The first wireless communication device may further associate respective first scatterers of the one or more first scatterers with respective second scatterers of the one or more second scatterers based on the respective first locations and the respective second locations to identify the one or more bistatic channel scatterers. For example, the bistatic communication channel circuitry 946 shown and described above in connection with FIG. 9 may provide a means to associate the first and second scatterers.

At block 1208, the first wireless communication device determines whether there is a line-of-sight (LOS) association between a respective first and second scatterer. In some examples, the first wireless communication device may identify a LOS link between the first wireless communication device and the second wireless communication device in response to, for a bistatic channel scatterer of the one or more bistatic channel scatterers corresponding to the second wireless communication device, a respective first location of the first scatterer corresponding to the bistatic channel scatterer matching a respective second location of the second scatterer corresponding to the bistatic channel scatterer. In some examples, the first wireless communication device may identify a non-LOS (NLOS) link between the first wireless communication device and the second wireless communication device in response to the one or more bistatic channel scatterers lacking a LOS scatterer association. For example, the bistatic communication channel circuitry 946 shown and described above in connection with FIG. 9 may provide a means to determine whether there is a LOS association.

If there is a LOS scatterer association (Y branch of block 1208), at block 1210, the first wireless communication device may adjust one or more communication parameters for transmission of a message based on a LOS link. In some examples, the first wireless communication device may adjust a time synchronization of the LOS link based on the respective average delay or respective delay spread of at least one bistatic channel scatterer of the one or more bistatic channel scatterers. In some examples, the first wireless communication device may adjust one or more of a beamwidth, transmit power, or transmit diversity scheme for transmission of the message based on respective scatterer locations and the respective angular spread of at least one bistatic channel scatterer of the one or more bistatic channel scatterers. For example, the bistatic communication channel circuitry 946, together with the communication and processing circuitry 942, shown and described above in connection with FIG. 9 may provide a means to adjust one or more communication parameters based on a LOS link.

If there is no LOS scatterer association (N branch of block 1208), at block 1212, the first wireless communication device may determine an association matrix indicating a respective association between each of the one or more first scatterers and each of the one or more second scatterers. For example, the bistatic communication channel circuitry 946 shown and described above in connection with FIG. 9 may provide a means to determine the association matrix.

At block 1214, the first wireless communication device may adjust one or more communication parameters for transmission of a message based on the association matrix. In some examples, the first wireless communication device may adjust at least one of a transmit waveform or a beamforming parameter for transmission of the message based on the association matrix. For example, the bistatic communication channel circuitry 946, together with the communication and processing circuitry 942, shown and described above in connection with FIG. 9 may provide a means to adjust one or more communication parameters based on a NLOS link.

In one configuration, the wireless communication device 900 includes means for transmitting a ranging signal and means for receiving reflected ranging signals based on the ranging signal to obtain first monostatic ranging channel information, as described in the present disclosure. The wireless communication device 900 further includes means for receiving, from a second wireless communication device, ranging feedback information based on second monostatic ranging channel information obtained by the second wireless communication device, and means for transmitting a message to the second wireless communication device based on bistatic channel information, the bistatic channel information being based on the first monostatic ranging channel information and the ranging feedback information, as described in the present disclosure. In one aspect, the aforementioned means may be the processor 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1 and/or 3-9, and utilizing, for example, the processes and/or algorithms described herein in relation to FIGS. 10-12.

The processes shown in FIGS. 10-12 may include additional aspects, such as any single aspect or any combination of aspects described below and/or in connection with one or more other processes described elsewhere herein.

Aspect 1: A method for wireless communication at a first wireless communication device, the method comprising: transmitting a ranging signal; receiving reflected ranging signals based on the ranging signal to obtain first monostatic ranging channel information; receiving, from a second wireless communication device, ranging feedback information based on second monostatic ranging channel information obtained by the second wireless communication device; and transmitting a message to the second wireless communication device based on bistatic channel information, the bistatic channel information being based on the first monostatic ranging channel information and the ranging feedback information.

Aspect 2: The method of aspect 1, wherein the first monostatic ranging channel information comprises one or more ranging channel parameters.

Aspect 3: The method of aspect 2, wherein the one or more ranging channel parameters comprise at least one of monostatic delay information or monostatic angular information corresponding to the reflected ranging signals.

Aspect 4: The method of any of aspects 1 through 3, wherein the first monostatic ranging channel information comprises first cluster information associated with one or more first scatterers detected by the first wireless communication device based on the reflected ranging signals, wherein the first monostatic ranging information comprises one or more of respective delay information or respective angular information associated with each of the one or more first scatterers.

Aspect 5: The method of aspect 4, wherein the ranging feedback information comprises second cluster information associated with one or more second scatterers detected by the second wireless communication device, and further comprising: associating the first cluster information with the second cluster information.

Aspect 6: The method of aspect 5, wherein the associating further comprises: associating the first cluster information with the second cluster information based on a location and an orientation of the second wireless communication device with respect to the first wireless communication device.

Aspect 7: The method of aspect 6, wherein the location and the orientation comprise a relative location and a relative orientation of the second wireless communication device with respect to the first wireless communication device, and further comprising: determining the relative location and the relative orientation using one or more sensors on the first wireless communication device.

Aspect 8: The method of aspect 6, wherein the location and the orientation comprise an absolute location and an absolute orientation of the second wireless communication device with respect to the first wireless communication device, and further comprising: receiving the absolute location and the absolute orientation of the second wireless communication device within the ranging feedback information.

Aspect 9: The method of any of aspects 6 through 8, further comprising: determining respective first locations of the one or more first scatterers based on the first cluster information and an additional location and an additional orientation of the first wireless communication device; determining respective second locations of the one or more second scatterers based on the ranging feedback information and the location and the orientation of the second wireless communication device with respect to the first wireless communication device; and associating respective first scatterers of the one or more first scatterers with respective second scatterers of the one or more second scatterers based on the respective first locations and the respective second locations to identify one or more bistatic channel scatterers.

Aspect 10: The method of aspect 9, further comprising: determining the bistatic channel information comprising at least one of bistatic delay information or bistatic angular information corresponding to each of the one or more bistatic channel scatterers.

Aspect 11: The method of aspect 10, wherein the bistatic channel information comprising one or more of a respective average delay, respective average Doppler shift, or respective average angular information corresponding to each of the one or more bistatic channel scatterers or one or more of a respective delay spread, respective Doppler spread, or respective angular spread corresponding to each of the one or more bistatic channel scatterers.

Aspect 12: The method of aspect 11, further comprising: adjusting a density of a demodulation reference signal associated with transmission of the message based on the respective delay spread and the respective Doppler spread of at least one bistatic channel scatterer of the one or more bistatic channel scatterers.

Aspect 13: The method of aspect 11 or 12, wherein the transmitting the message to the second wireless communication device based on the bistatic channel information further comprises: transmitting the message to the second wireless communication device using at least one of a beam or precoding matrix selected based on the respective average angular information and respective angular spread of at least one bistatic channel scatterer of the one or more bistatic channel scatterers.

Aspect 14: The method of any of aspects 11 through 13, further comprising: tracking each of the one or more bistatic channel scatterers using additional monostatic ranging channel information and additional ranging feedback information to identify a respective cluster motion of at least one bistatic channel scatterer of the one or more bistatic channel scatterers; and adjusting one or more of a beam, precoding matrix, or density of a demodulation reference signal associated with transmission of the message based on the respective cluster motion of the at least one bistatic channel scatterer.

Aspect 15: The method of any of aspects 11 through 14, further comprising: adjusting at least one of a subcarrier spacing, a cyclic prefix length, a transmission bandwidth, or a rate-matching parameter for transmission of the message based on the bistatic channel information.

Aspect 16: The method of any of aspects 11 through 15, wherein the bistatic channel information comprises link information indicating whether a communication link between the first wireless communication device and the second wireless communication device is a line of sight (LOS) link or a non-LOS (NLOS) link.

Aspect 17: The method of aspect 16, further comprising: identifying the LOS link between the first wireless communication device and the second wireless communication device in response to, for a bistatic channel scatterer of the one or more bistatic channel scatterers corresponding to the second wireless communication device, the respective first location of the respective first scatterer corresponding to the bistatic channel scatterer matching the respective second location of the respective second scatterer corresponding to the bistatic channel scatterer.

Aspect 18: The method of aspect 17, further comprising: adjusting a time synchronization of the LOS link based on the respective average delay or respective delay spread of at least one bistatic channel scatterer of the one or more bistatic channel scatterers.

Aspect 19: The method of aspect 17 or 18, further comprising: adjusting one or more of a beamwidth, transmit power, or transmit diversity scheme for transmission of the message based on respective scatterer locations and the respective angular spread of at least one bistatic channel scatterer of the one or more bistatic channel scatterers.

Aspect 20: The method of aspect 16, further comprising: identifying the NLOS link between the first wireless communication device and the second wireless communication device in response to the one or more bistatic channel scatterers lacking a LOS scatterer association.

Aspect 21: The method of aspect 20, further comprising: determining an association matrix indicating a respective association between each of the one or more first scatterers and each of the one or more second scatterers; and adjusting at least one of a transmit waveform or a beamforming parameter for transmission of the message based on the association matrix.

Aspect 22: A first wireless communication device configured for wireless communication comprising a transceiver, a ranging device, a memory, and a processor coupled to the transceiver, the ranging device and the memory, the processor and the memory configured to perform a method of any one of aspects 1 through 21.

Aspect 23: The first wireless communication device of aspect 22, wherein the ranging device comprises a radar system, and wherein the transceiver is further utilized by the radar system to transmit the ranging signal and receive the reflected ranging signals.

Aspect 24: A first wireless communication device configured for wireless communication comprising means for performing a method of any one of aspects 1 through 21.

Aspect 25: A non-transitory computer-readable medium having stored therein instructions executable by one or more processors of a first wireless communication device configured for wireless communication to perform a method of any one of aspects 1 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and/or 3-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device configured for wireless communication, comprising:
   one or more transceivers;
   a ranging device;
   one or more memories; and
   one or more processors coupled to the one or more transceivers, the ranging device, and the one or more memories, wherein the one or more processors are configured to:
   transmit a ranging signal via the ranging device;
   receive reflected ranging signals based on the ranging signal via the ranging device to obtain first monostatic ranging channel information;
   receive, from a second wireless communication device via a sidelink for wireless communication between the first wireless communication and the second wireless communication device and via the one or more transceivers, ranging feedback information based on second monostatic ranging channel information obtained by the second wireless communication device; and
   transmit a message to the second wireless communication device via the one or more transceivers based on bistatic channel information, the bistatic channel information being based on the first monostatic ranging channel information and the ranging feedback information.

2. The first wireless communication device of claim 1, wherein the first monostatic ranging channel information comprises one or more ranging channel parameters.

3. The first wireless communication device of claim 2, wherein the one or more ranging channel parameters comprise at least one of monostatic delay information or monostatic angular information corresponding to the reflected ranging signals.

4. The first wireless communication device of claim 1, wherein the first monostatic ranging channel information comprises first cluster information associated with one or more first scatterers detected by the first wireless communication device based on the reflected ranging signals, wherein the first monostatic ranging information comprises one or more of respective delay information or respective angular information associated with each of the one or more first scatterers.

5. The first wireless communication device of claim 4, wherein the ranging feedback information comprises second cluster information associated with one or more second scatterers detected by the second wireless communication device, and wherein the one or more processors are further configured to:
   associate the first cluster information with the second cluster information.

6. The first wireless communication device of claim 5, wherein the one or more processors are further configured to:
   associate the first cluster information with the second cluster information based on a location and an orientation of the second wireless communication device with respect to the first wireless communication device.

7. The first wireless communication device of claim 6, wherein the location and the orientation comprise a relative location and a relative orientation of the second wireless communication device with respect to the first wireless communication device, and wherein the one or more processors are further configured to:
determine the relative location and the relative orientation using one or more sensors on the first wireless communication device.

8. The first wireless communication device of claim 6, wherein the location and the orientation comprise an absolute location and an absolute orientation of the second wireless communication device with respect to the first wireless communication device, and wherein the one or more processors are further configured to:
receive the absolute location and the absolute orientation of the second wireless communication device within the ranging feedback information.

9. The first wireless communication device of claim 6, wherein the one or more processors are further configured to:
determine respective first locations of the one or more first scatterers based on the first cluster information and an additional location and an additional orientation of the first wireless communication device;
determine respective second locations of the one or more second scatterers based on the ranging feedback information and the location and the orientation of the second wireless communication device with respect to the first wireless communication device; and
associate respective first scatterers of the one or more first scatterers with respective second scatterers of the one or more second scatterers based on the respective first locations and the respective second locations to identify one or more bistatic channel scatterers.

10. The first wireless communication device of claim 9, wherein the one or more processors are further configured to:
determine the bistatic channel information comprising at least one of bistatic delay information or bistatic angular information corresponding to each of the one or more bistatic channel scatterers.

11. The first wireless communication device of claim 10, wherein the bistatic channel information comprises:
one or more of a respective average delay, respective average Doppler shift, or respective average angular information corresponding to each of the one or more bistatic channel scatterers, or
one or more of a respective delay spread, respective Doppler spread, or respective angular spread corresponding to each of the one or more bistatic channel scatterers.

12. The first wireless communication device of claim 11, wherein the bistatic channel information comprises the respective delay spread and the respective Doppler spread of at least one bistatic channel scatterer of the one or more bistatic channel scatterers and wherein the one or more processors are further configured to:
adjust a density of a demodulation reference signal associated with transmission of the message based on the respective delay spread and the respective Doppler spread of the at least one bistatic channel scatterer of the one or more bistatic channel scatterers.

13. The first wireless communication device of claim 11, wherein the bistatic channel information comprises the respective angular information and the respective angular spread of at least one bistatic channel scatterer of the one or more bistatic channel scatterers, and wherein the one or more processors are further configured to:
transmit the message to the second wireless communication device using at least one of a beam or precoding matrix selected based on the respective average angular information and the respective angular spread of the at least one bistatic channel scatterer of the one or more bistatic channel scatterers.

14. The first wireless communication device of claim 11, wherein the one or more processors are further configured to:
track each of the one or more bistatic channel scatterers using additional monostatic ranging channel information and additional ranging feedback information to identify a respective cluster motion of at least one bistatic channel scatterer of the one or more bistatic channel scatterers; and
adjust one or more of a beam, precoding matrix, or density of a demodulation reference signal associated with transmission of the message based on the respective cluster motion of the at least one bistatic channel scatterer.

15. The first wireless communication device of claim 11, wherein the one or more processors are further configured to:
adjust at least one of a subcarrier spacing, a cyclic prefix length, a transmission bandwidth, or a rate-matching parameter for transmission of the message based on the bistatic channel information.

16. The first wireless communication device of claim 11, wherein the bistatic channel information comprises link information indicating whether a communication link between the first wireless communication device and the second wireless communication device is a line of sight (LOS) link or a non-LOS (NLOS) link.

17. The first wireless communication device of claim 16, wherein the one or more processors are further configured to:
identify the LOS link between the first wireless communication device and the second wireless communication device in response to, for a bistatic channel scatterer of the one or more bistatic channel scatterers corresponding to the second wireless communication device, the respective first location of the respective first scatterer corresponding to the bistatic channel scatterer matching the respective second location of the respective second scatterer corresponding to the bistatic channel scatterer.

18. The first wireless communication device of claim 17, wherein the one or more processors are further configured to:
adjust a time synchronization of the LOS link based on the respective average delay or respective delay spread of at least one bistatic channel scatterer of the one or more bistatic channel scatterers.

19. The first wireless communication device of claim 17, wherein the bistatic channel information comprises the respective angular spread of at least one bistatic channel scatterer of the one or more bistatic channel scatterers, and wherein the one or more processors are further configured to:
adjust one or more of a beamwidth, transmit power, or transmit diversity scheme for transmission of the message based on respective scatterer locations and the respective angular spread of the at least one bistatic channel scatterer of the one or more bistatic channel scatterers.

20. The first wireless communication device of claim 16, wherein the one or more processors are further configured to:
identify the NLOS link between the first wireless communication device and the second wireless communication device in response to the one or more bistatic channel scatterers lacking a LOS scatterer association.

21. The first wireless communication device of claim 20, wherein the one or more processors are further configured to:
determine an association matrix indicating a respective association between each of the one or more first scatterers and each of the one or more second scatterers; and
adjust at least one of a transmit waveform or a beamforming parameter for transmission of the message based on the association matrix.

22. The first wireless communication device of claim 1, wherein the ranging device comprises a radar system, and wherein the one or more transceivers are further utilized by the radar system to transmit the ranging signal and receive the reflected ranging signals.

23. A method for wireless communication at a first wireless communication device, the method comprising:
transmitting a ranging signal;
receiving reflected ranging signals based on the ranging signal to obtain first monostatic ranging channel information;
receiving, from a second wireless communication device via a sidelink for wireless communication between the first wireless communication device and the second wireless communication device, ranging feedback information based on second monostatic ranging channel information obtained by the second wireless communication device; and
transmitting a message to the second wireless communication device based on bistatic channel information, the bistatic channel information being based on the first monostatic ranging channel information and the ranging feedback information.

24. The method of claim 23, wherein the first monostatic ranging channel information comprises first cluster information associated with one or more first scatterers detected by the first wireless communication device based on the reflected ranging signals, wherein the first monostatic ranging channel information comprises one or more of respective delay information or respective angular information associated with each of the one or more first scatterers.

25. The method of claim 24, wherein the ranging feedback information comprises second cluster information associated with one or more second scatterers detected by the second wireless communication device, and further comprising:
associating the first cluster information with the second cluster information based on a location and an orientation of the second wireless communication device with respect to the first wireless communication device.

26. The method of claim 25, wherein the associating the first cluster information with the second cluster information further comprises:
determining respective first locations of the one or more first scatterers based on the first cluster information and an additional location and an additional orientation of the first wireless communication device;
determining respective second locations of the one or more second scatterers based on the ranging feedback information and the location and the orientation of the second wireless communication device with respect to the first wireless communication device; and
associating respective first scatterers of the one or more first scatterers with respective second scatterers of the one or more second scatterers based on the respective first locations and the respective second locations to identify one or more bistatic channel scatterers.

27. The method of claim 26, further comprising:
determining the bistatic channel information comprising:
one or more of a respective average delay, respective average Doppler shift, or respective average angular information corresponding to each of the one or more bistatic channel scatterers,
one or more of a respective delay spread, respective Doppler spread, or respective angular spread corresponding to each of the one or more bistatic channel scatterers, or
link information indicating whether a communication link between the first wireless communication device and the second wireless communication device is a line of sight (LOS) link or a non-LOS (NLOS) link.

28. The method of claim 27, further comprising:
adjusting a density of a demodulation reference signal associated with transmission of the message based on the respective delay spread and the respective Doppler spread of at least one bistatic channel scatterer of the one or more bistatic channel scatterers when the bistatic channel information comprises the respective delay spread and the respective Doppler spread of the at least one bistatic channel scatterer of the one or more bistatic channel scatterers, or
adjusting at least one of a subcarrier spacing, a cyclic prefix length, a transmission bandwidth, or a rate-matching parameter for transmission of the message based on the bistatic channel information.

29. The method of claim 27, wherein the bistatic channel information comprises the respective angular information and the respective angular spread of at least one bistatic channel scatterer of the one or more bistatic channel scatterers, and wherein the transmitting the message to the second wireless communication device based on the bistatic channel information further comprises:
transmitting the message to the second wireless communication device using at least one of a beam or precoding matrix selected based on the respective average angular information and the respective angular spread of the at least one bistatic channel scatterer of the one or more bistatic channel scatterers.

30. A first wireless communication device configured for wireless communication, comprising:
means for transmitting a ranging signal;
means for receiving reflected ranging signals based on the ranging signal to obtain first monostatic ranging channel information;
means for receiving, from a second wireless communication device via a sidelink for wireless communication between the first wireless communication device and the second wireless communication device, ranging feedback information based on second monostatic ranging channel information obtained by the second wireless communication device; and means for transmitting a message to the second wireless communication device based on bistatic channel information, the bistatic channel information being based on the first monostatic ranging channel information and the ranging feedback information.

* * * * *